INVENTOR.
PAUL S. DICKEY
BY
Raymond W. Junkins
ATTORNEY

June 26, 1962  P. S. DICKEY  3,040,719
VAPOR GENERATING AND SUPERHEATING SYSTEMS
Filed April 21, 1952  12 Sheets-Sheet 4

INVENTOR.
PAUL S. DICKEY
BY
Raymond W. Junkins
ATTORNEY

INVENTOR.
PAUL S. DICKEY

INVENTOR.
PAUL S. DICKEY

INVENTOR.
PAUL S. DICKEY
BY Raymond D. Junkins
ATTORNEY 3,040,719
VAPOR GENERATING AND SUPERHEATING
SYSTEMS
Paul S. Dickey, East Cleveland, Ohio, assignor to Bailey
Meter Company, a corporation of Delaware
Filed Apr. 21, 1952, Ser. No. 283,275
25 Claims. (Cl. 122—479)

My invention lies in the field of steam power generation and particularly in the control of steam temperature in connection with present day vapor generators. Practically all central station capacity presently being installed, or on order, in the United States has rated steam conditions above 800 p.s.i.g. and 800 FTT; the higher operating temperature being 1050 FTT at pressures from 1500 p.s.i.g. to 2000 p.s.i.g. and rated load from 500,000 to 1,000,000 lb. per hr. The problems involved in the generation and close control of the properties of steam are quite different now than was the case at the time of the inventions in this field which are shown in the prior art.

Superheat temperature control is particularly desirable in the generation of steam for the production of electrical energy in large central station power plants. In such plants, the upper limit of superheat temperature is governed by the materials and construction of the turbines served by the steam. In the interest of turbine efficiency the temperature of the steam delivered to the turbine should be maintained within close optimum limits throughout a wide range of operation.

With the superheating or resuperheating of the steam in one or more convention type heat exchange surfaces, the size and cost of such surfaces becomes a material factor in the total cost of the unit and any improvement leading to a reduction in the size of superheaters becomes of considerable importance. Usually these surfaces must be made of expensive high-alloy tubing to satisfactorily handle the temperatures and pressures encountered.

It is thus a prime desideratum, in the design of such a unit, to proportion the steam generating surfaces and the steam superheating surfaces to give a desired final steam temperature at "rated load." At "peak load," in excess of the rated load, the final steam temperature will be in excess of that desired and correspondingly at lower rating the steam temperature will not equal that desired. This is due to the characteristic curve of convection type heat exchangers which have a rising function with load (FIG. 2). It is false economy to design the superheater for desired final steam temperature at "peak load," for at all loads below that value, the unit would produce steam which is below the desired final temperature. On the other hand, the design of a superheater to produce the desired final steam temperature at some rating below "rated load" would require an excessive cost of superheating surface and an excessive final steam temperature throughout the upper rating with consequent danger to the turbine or the necessity of extracting some of the surplus heat from the final superheated steam.

To reach the desired high superheated steam temperature, but not to exceed it, requires careful proportioning of the heat absorbing surfaces both for generating steam and for superheating it. But even if the desired superheated steam temperature be just attained initially by very careful designing at "rated load," the superheated steam temperature will vary during operation by reason of changes in cleanliness of the heat absorbing surfaces. Slag will form and adhere to the heat absorbing surfaces in the furnace thereby reducing the effectiveness of such surfaces and raising the furnace outlet temperature of the products of combustion. Furnace outlet temperature will also change with percentage of excess air supplied for combustion, with the characteristics of the fuel burned, and with the rate of combustion and the corresponding rate of steam generation. All of these things will therefore affect the temperature of the gases, whether the superheating elements are located in the furnace where they absorb heat by radiation from the burning fuel and products of combustion, or whether they are located beyond the furnace where they absorb heat by convection only from the products of combustion.

With the furnace volume, as well as the vapor generating furnace surface, and the vapor superheating surface, fixed and invariable, the possibility of satisfactorily controlling the final steam temperature lies in controlling the volume and temperature of the gases contacting the superheating surfaces. Fuel and air supply must be varied with rating or demand to provide the desired steam flow rate at the desired steam pressure. The furnace temperature of the flame and products of combustion does not vary greatly with rating. This leaves the controllable variable as the volume and temperature of the gases entering the convection superheating surfaces. The volume or mass flow rate has been controlled in the past through by-passing some of the gas flow around at least a portion of the superheating surfaces. In some instances water spray attemperation has been used to absorb excess heat from the steam at a preselected location in its flow path. The temperature of the entering gases may be controlled by selecting the amount of generating surface to be contacted by the gases before they enter the superheating surfaces or by controlling the temperature and mass flow of gases leaving the furnace through recirculating cooler products of combustion to the furnace.

For any given furnace, as load increases, the rate of heat absorption does not increase as rapidly as the rate of heat liberation; therefore, the furnace leaving temperature will rise. With both the quantity rate and the temperature of the gases leaving the furnace increasing with load, it is apparent that a fixed surface convection superheater will receive a greater heat rate at higher loads than at lower loads and the heat transfer area is usually designed for the volume and temperature of leaving gases at "rated load." Any further increase in heat release rate supplies to the fixed superheater surface more heat by gas volume and by gas temperature than it is designed for and a corresponding excessive final steam temperature is experienced. Correspondingly, at operation below the rated load, the fixed superheater surface receives less volume and a lower temperature of gases leaving the furnace with corresponding lowering of final steam temperature leaving the superheater. It is therefore a principal object of my invention to provide an improved method and apparatus for extracting excessive heat from the steam at high rating and for supplying additional heat to the steam at low ratings, to the end that the final steam temperature will approximate a uniform value over a range of operating ratings at each side of the "rated load" value.

I preferably consider a unit which has been designed to provide the desired final steam temperature at "rated load." Throughout an upper range of rating between the "rated load" and a "peak load," I may controllably by-pass at least a portion of the products of combustion around a portion of the steam superheating surfaces or, in other installations, I apply water spray attemperation. As rating decreases, below "rated load," I controllably decrease the percentage of liberated heat which is absorbed by the radiant generating surfaces. At the same time the leaving temperature of the gases of combustion is raised as well as the mass flow, to the end that a greater proportion of the liberated heat is delivered to the convection superheating surfaces. This control of the temperature and volume of combustion gases is accomplished by recirculating to the furnace a variable proportion of partially cooled products of combustion abstracted from the inlet side of the air heater. The exact location of entrance of the recirculated gases to the furnace is not a part of the present invention. A principal object of my invention is to provide an improved method and control system effective in positioning the by-pass damper or the attemperator control valve and in controlling the recirculation rate of gases.

Recirculation of partially cooled products of combustion is not a new device. With a water cooled furnace it is known that the heat availability of the gases at the entrance to convection superheating surfaces is increased when the percentage recirculated is increased as rating decreases. This may be due to relative increase in gas temperature and/or mass flow. The lower rating end of the convection characteristic curve is raised while the upper end may actually be lowered. The controlled change in temperature and/or mass flow rate of the gases leaving the furnace may result from different effects of the introduction of recirculated gases at different furnace locations. One theory that has been advanced is of delayed combustion and change in temperature of the combustion process. Another is the blanketing or shielding effect of the recirculated gases between the combustion process and the radiant receiving walls. Still other causes may be the dilution of the fresh products of combustion and the heating up of the recirculated gases. Actually relatively small amounts of the products of combustion are recirculated. As rating decreases from "rated load" the rate of gas recirculation is increased thus relatively decreasing the absorption of heat by the radiant generating surface while relatively increasing both the volume flow rate and temperature of the gases leaving the combustion zone and entering the superheating surfaces. The present invention provides a control of the recirculation of products of combustion to lower the radiant heat absorption with decrease in rating and thus to increase the volume and temperature of the gases leaving the furnace and entering the superheating surfaces.

My present invention has as a primary object the provision of method and apparatus for operating, and controlling the operation of, such a vapor generating unit through the utilization of more advantageous indexes of heat availability to the convection superheater and of operation of the unit as a whole.

Figure 4:
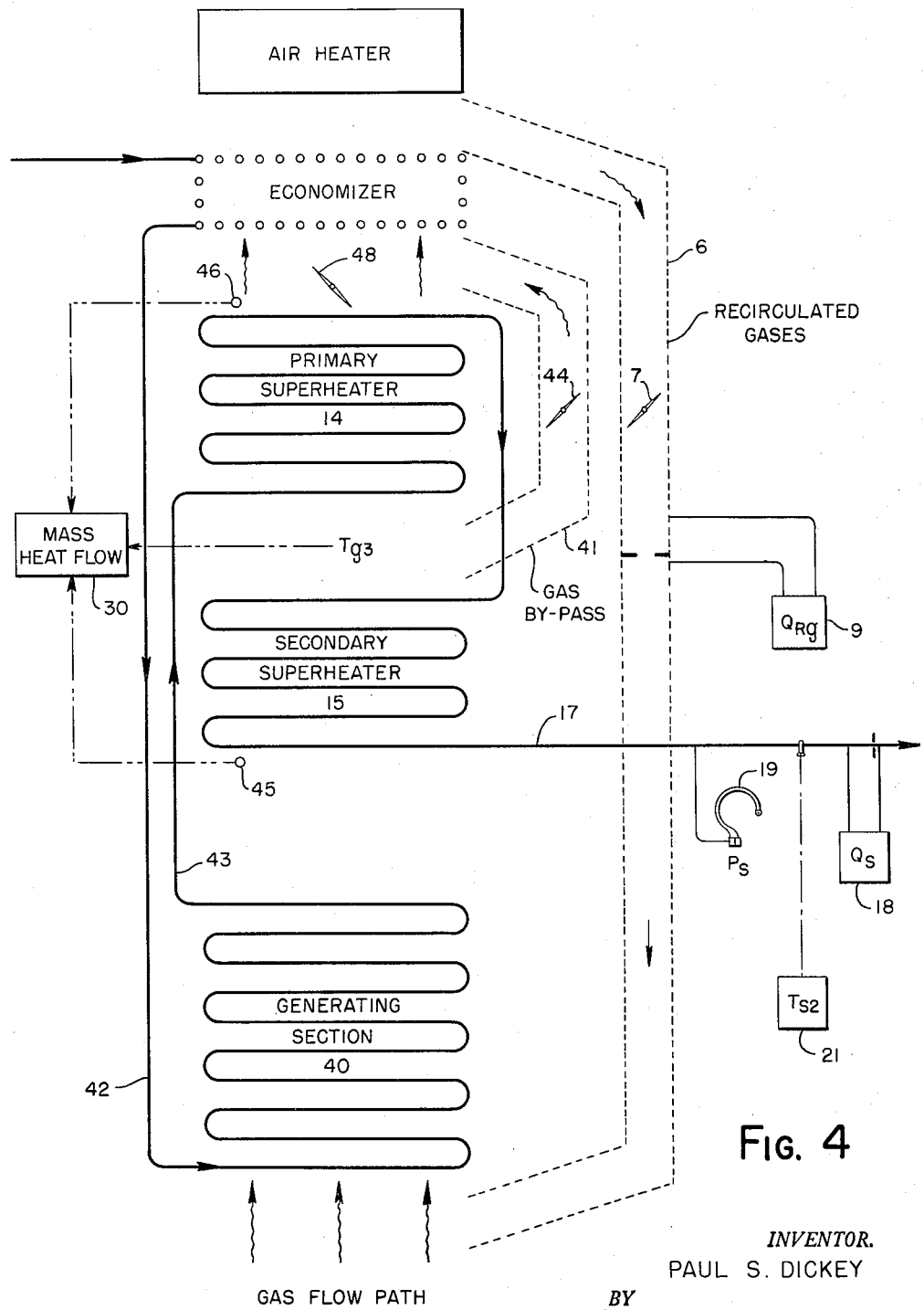

FIG. 4 diagrammatically represents the steam and gas paths for a unit utilizing gas recirculation and gas by-pass.

Figure 5:
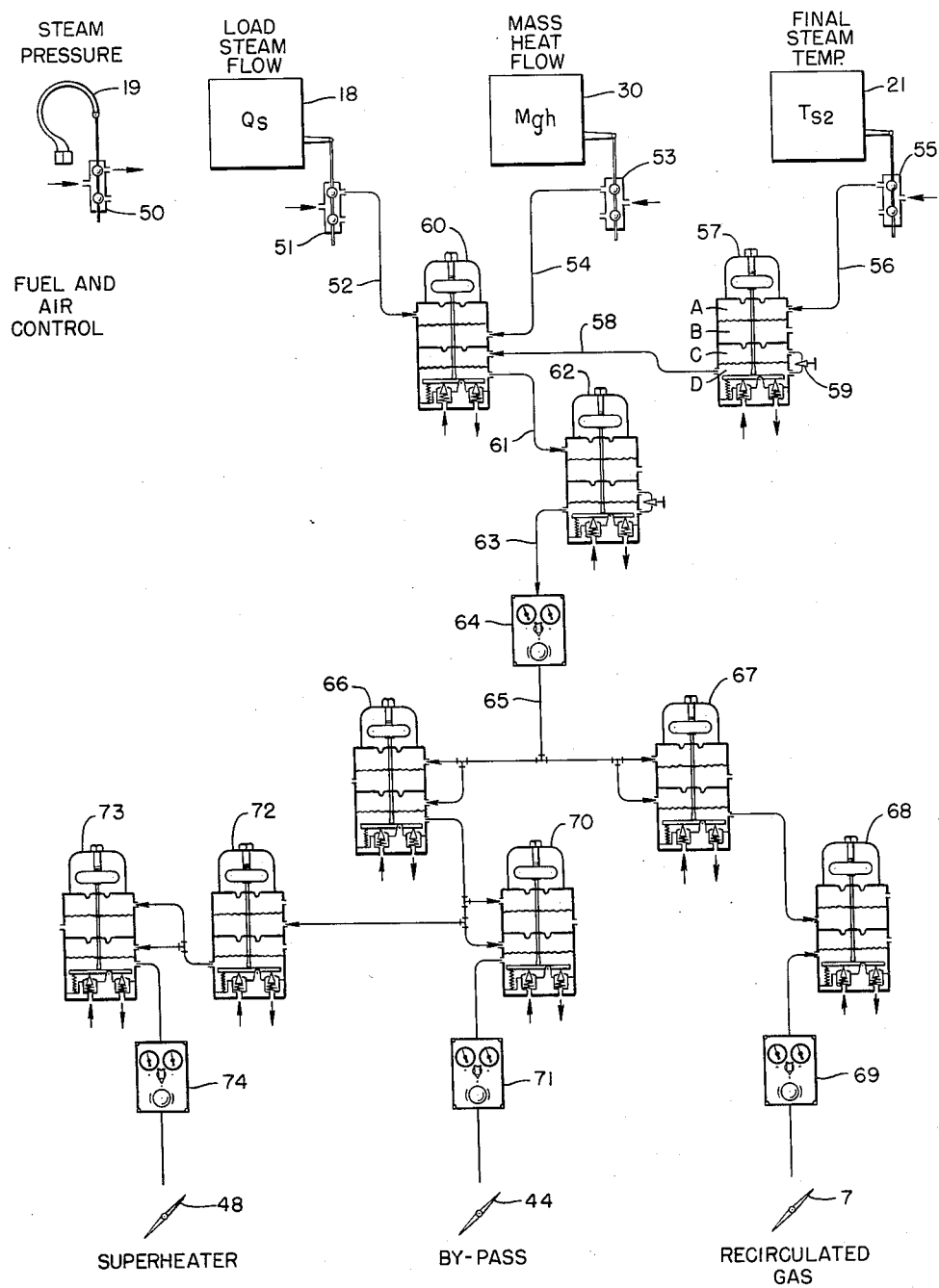

FIG. 5 illustrates a pneumatic control system for the unit of FIG. 4.

Figure 6:
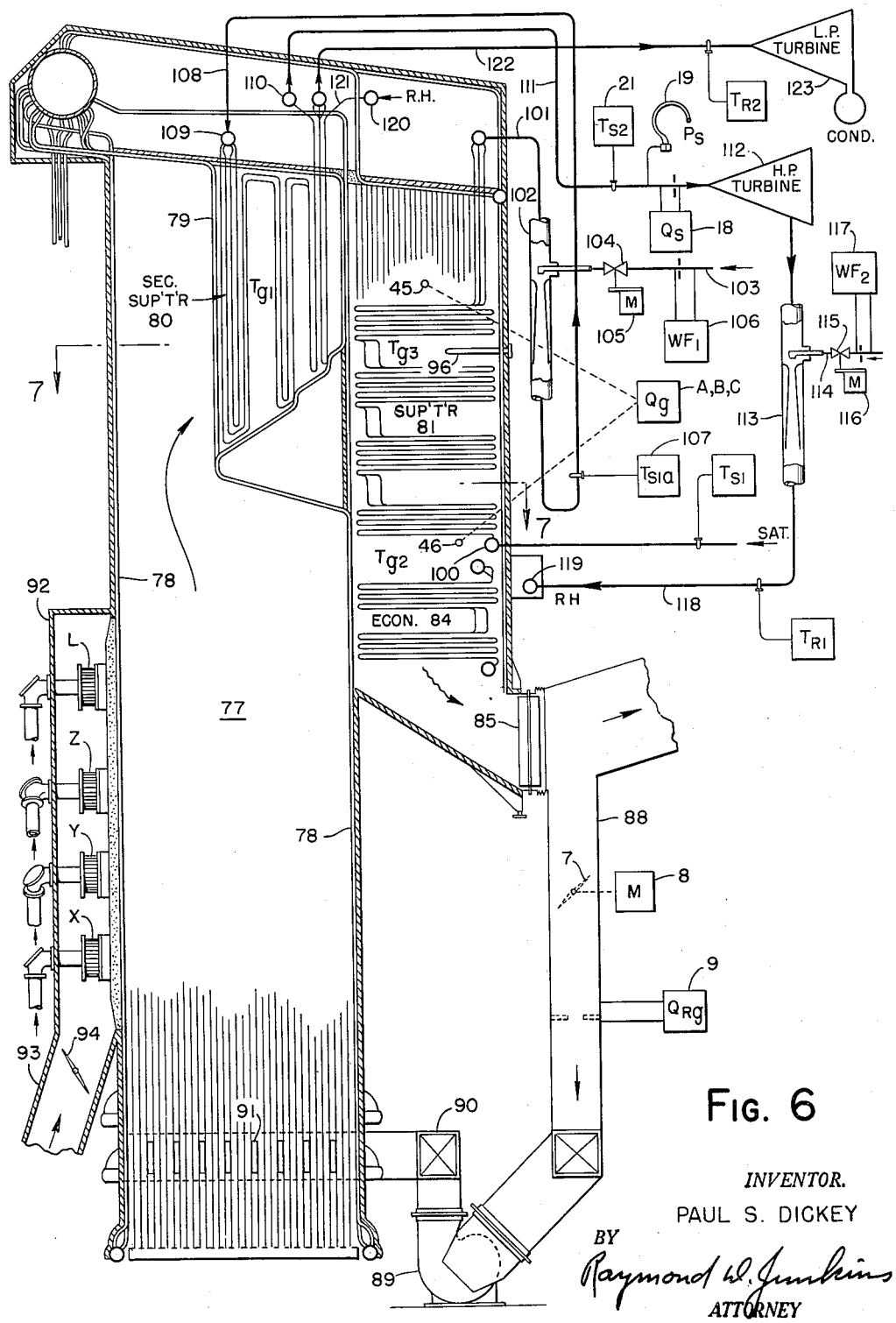

FIG. 6 is a sectional elevation of a unit having reheat surface and employing attemperation.

Figure 7:
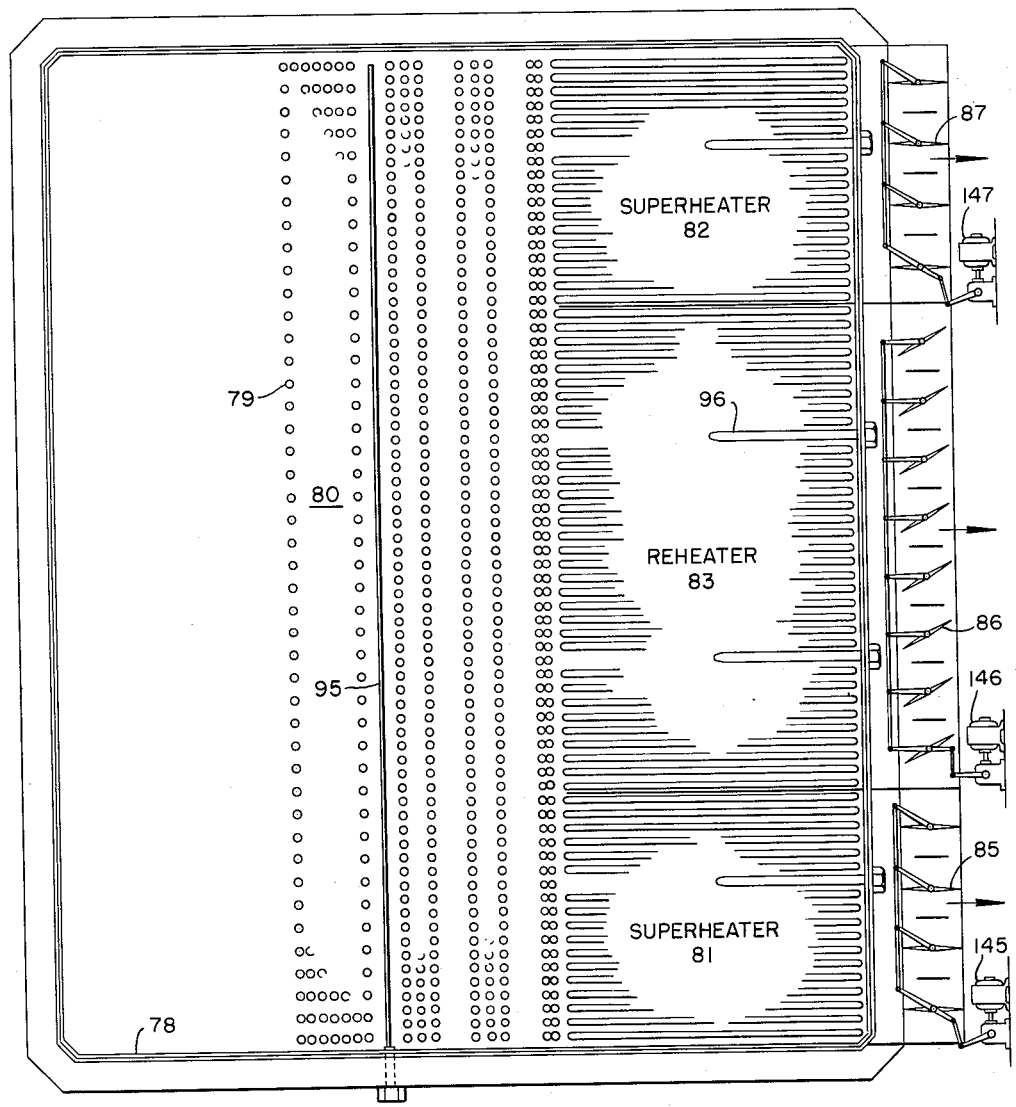

FIG. 7 is a section along the line 7—7 of FIG. 6, in the direction of the arrows.

Figure 8:
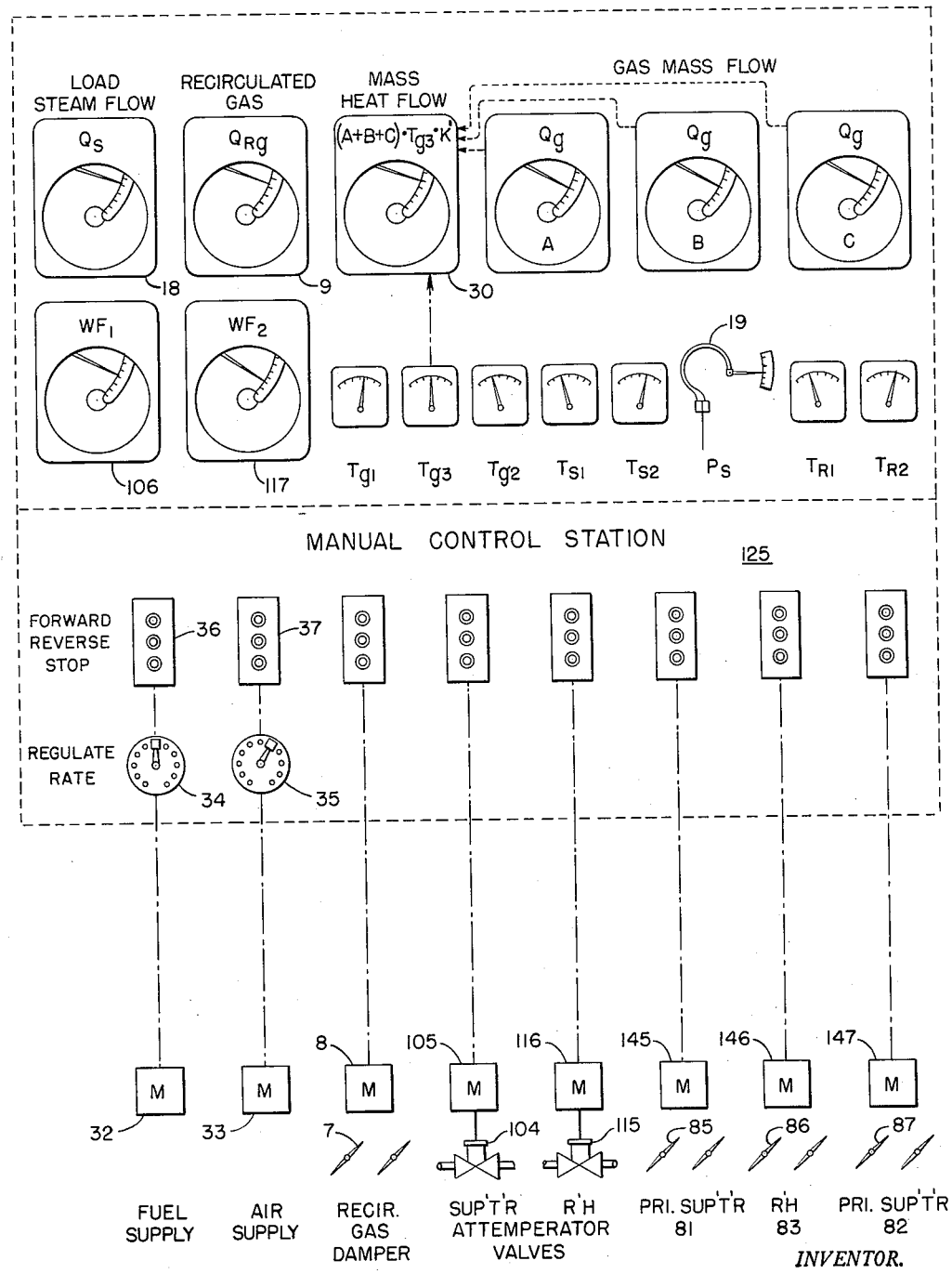

FIG. 8 illustrates a manual control station for regulating the operation of the unit of FIGS. 6 and 7.

Figure 9:
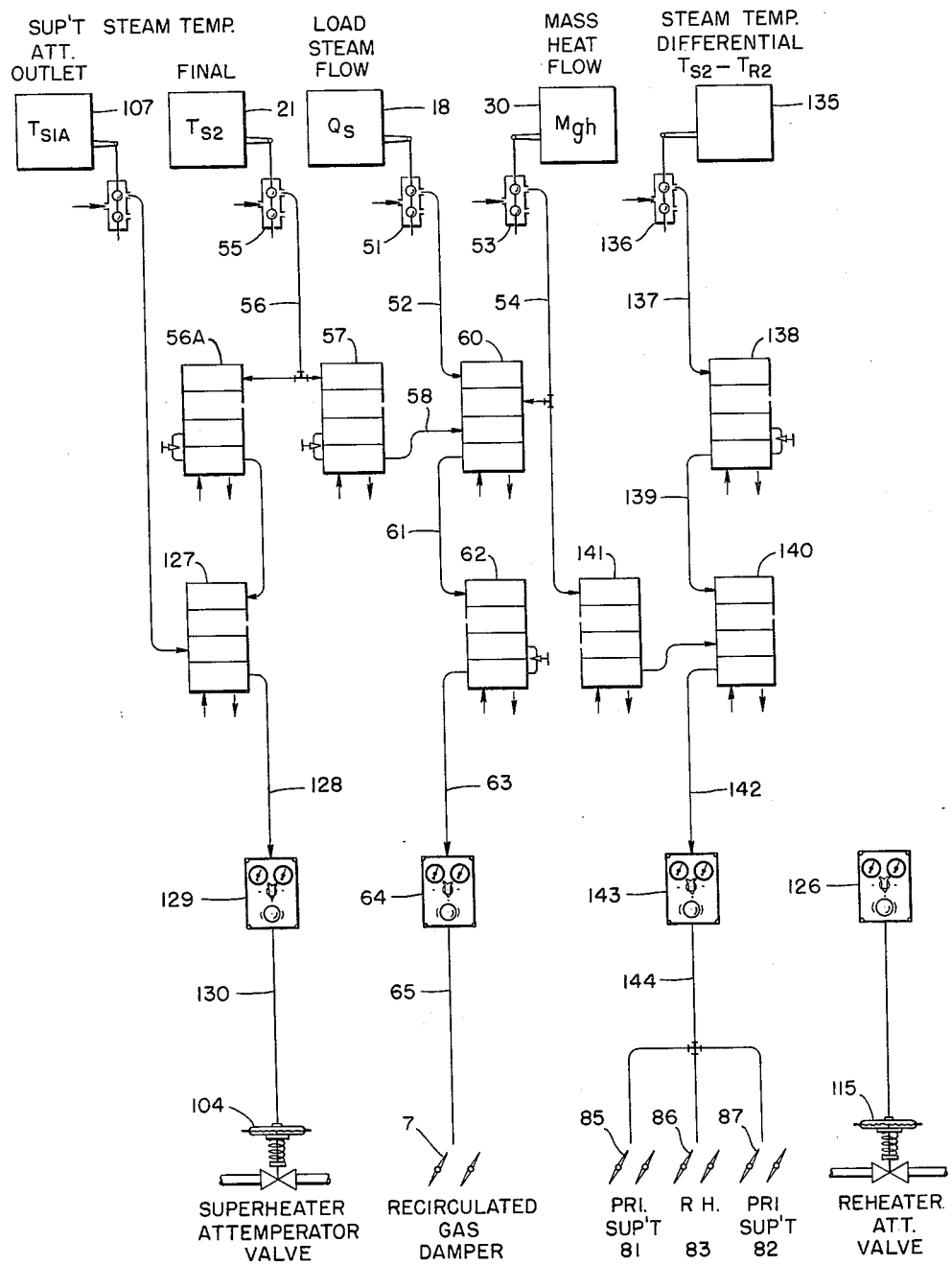

FIG. 9 represents a pneumatic control system for the unit of FIGS. 6 and 7.

Figure 10:
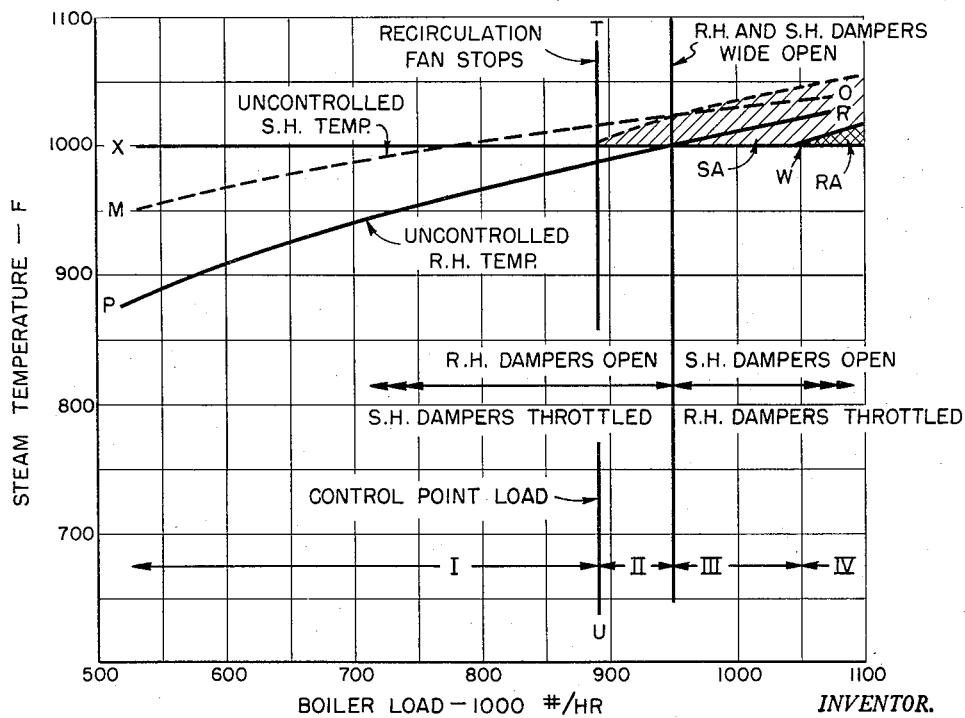

FIG. 10 is a graph of characteristics of convection superheating and reheating surface of a unit similar to that of FIG. 6.

Figure 11:
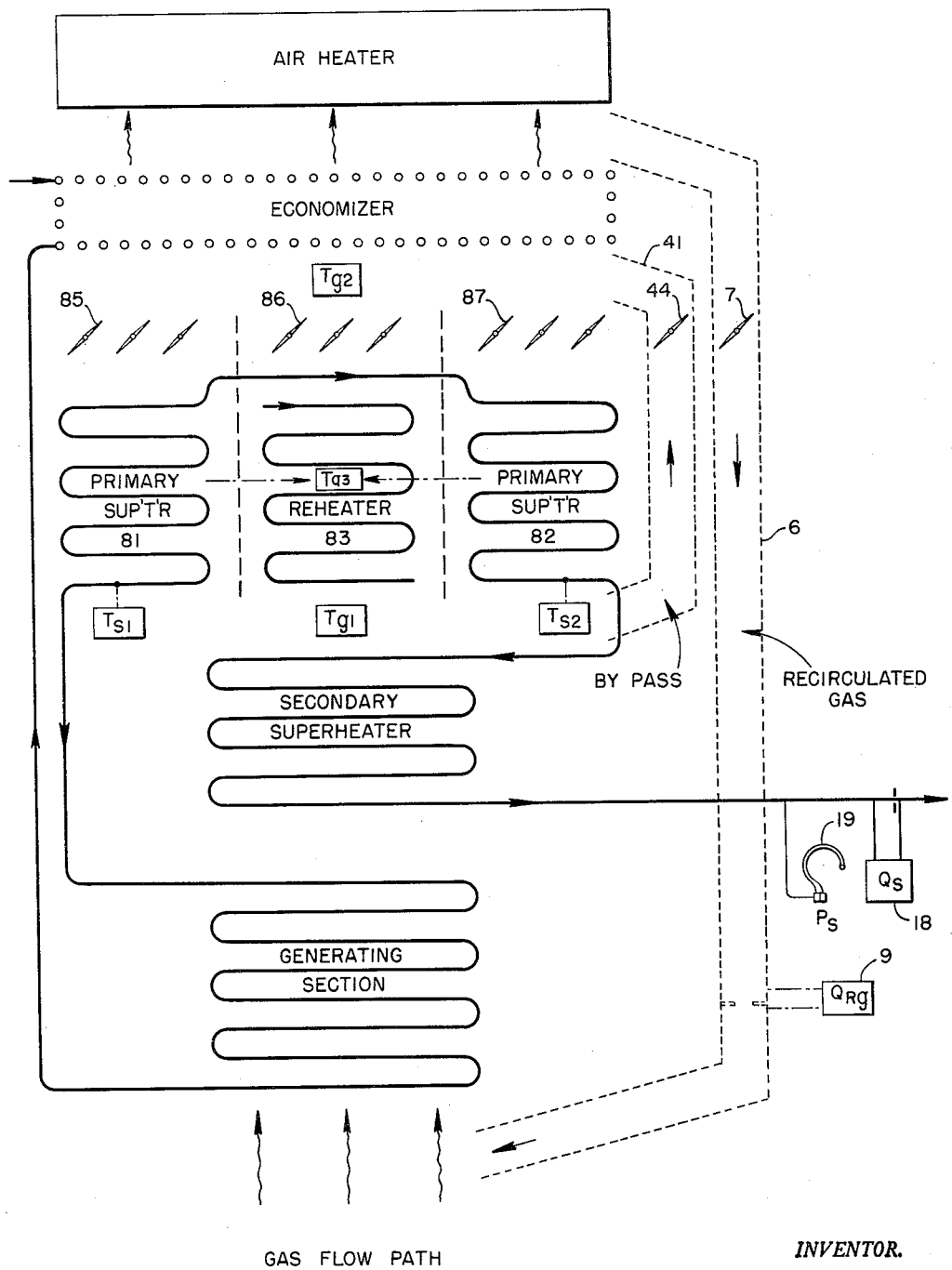

FIG. 11 diagrammatically represents the steam and gas paths for the unit of FIGS. 6 and 7 but utilizing gas by-pass rather than attemperation.

Figure 12:
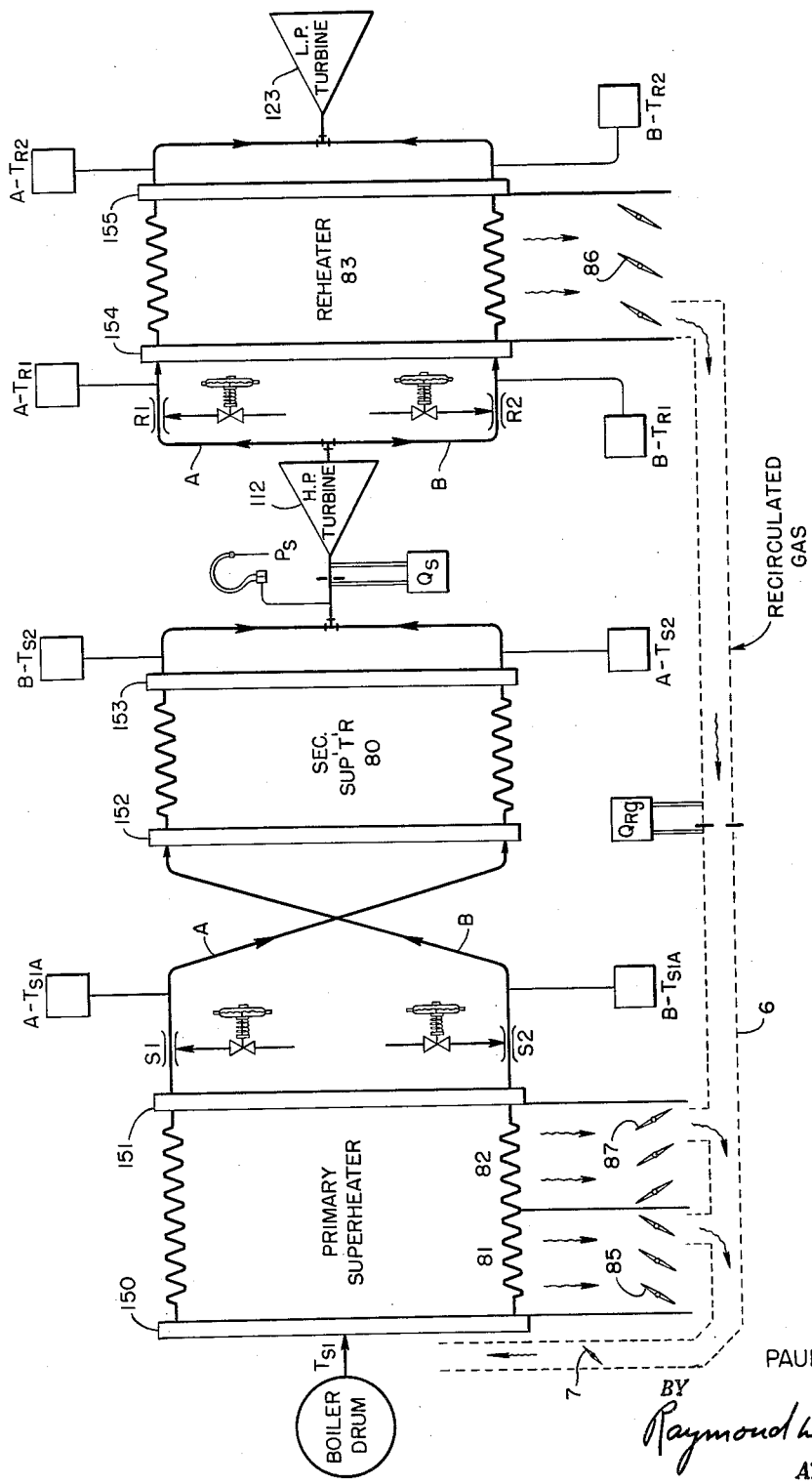

FIG. 12 illustrates the steam and gas paths of a twin circuit vapor generating, superheating and reheating unit employing attemperation and gas distribution.

Figure 13:
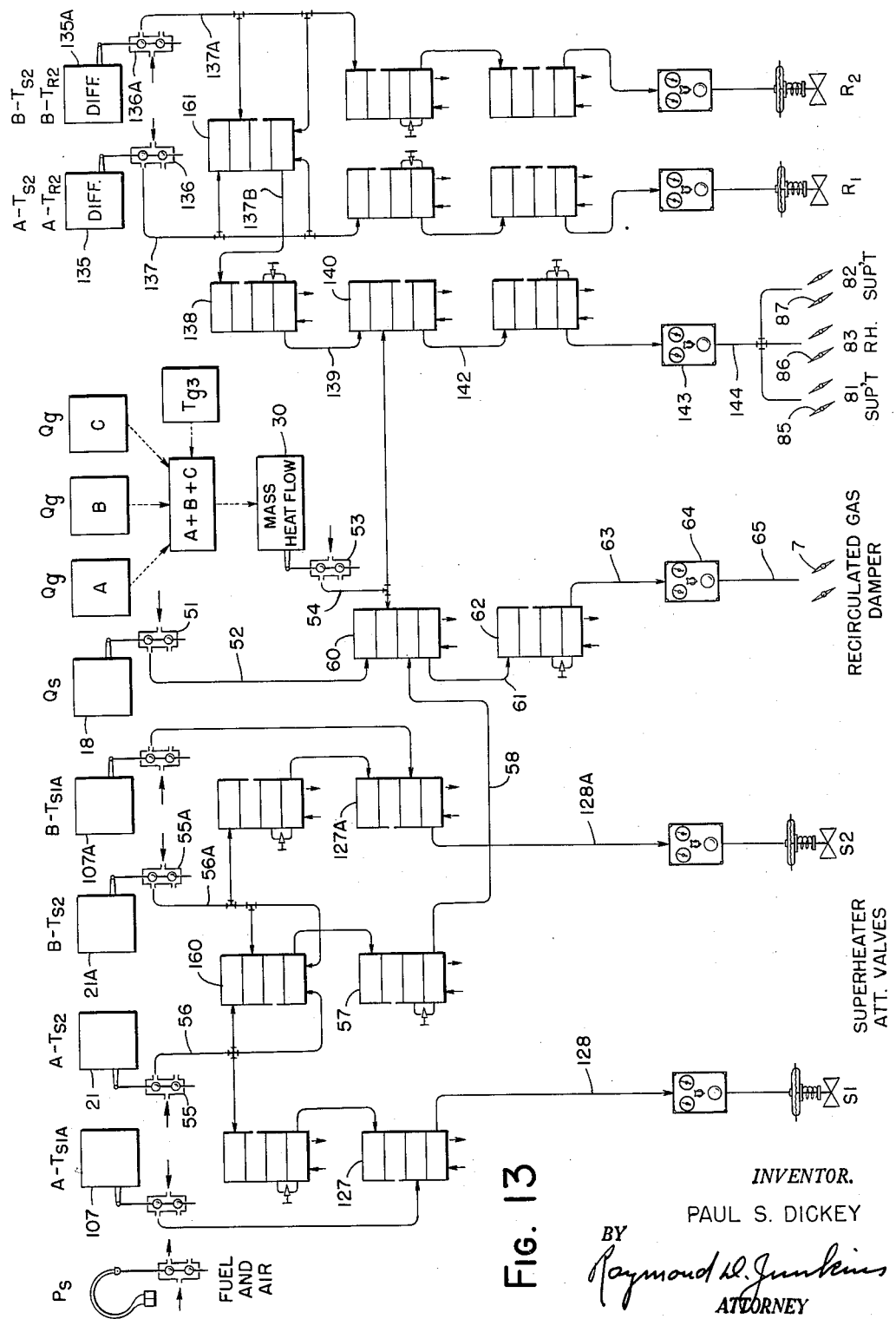

FIG. 13 illustrates a pneumatic control system in connection with FIG. 12.

Figure 1:
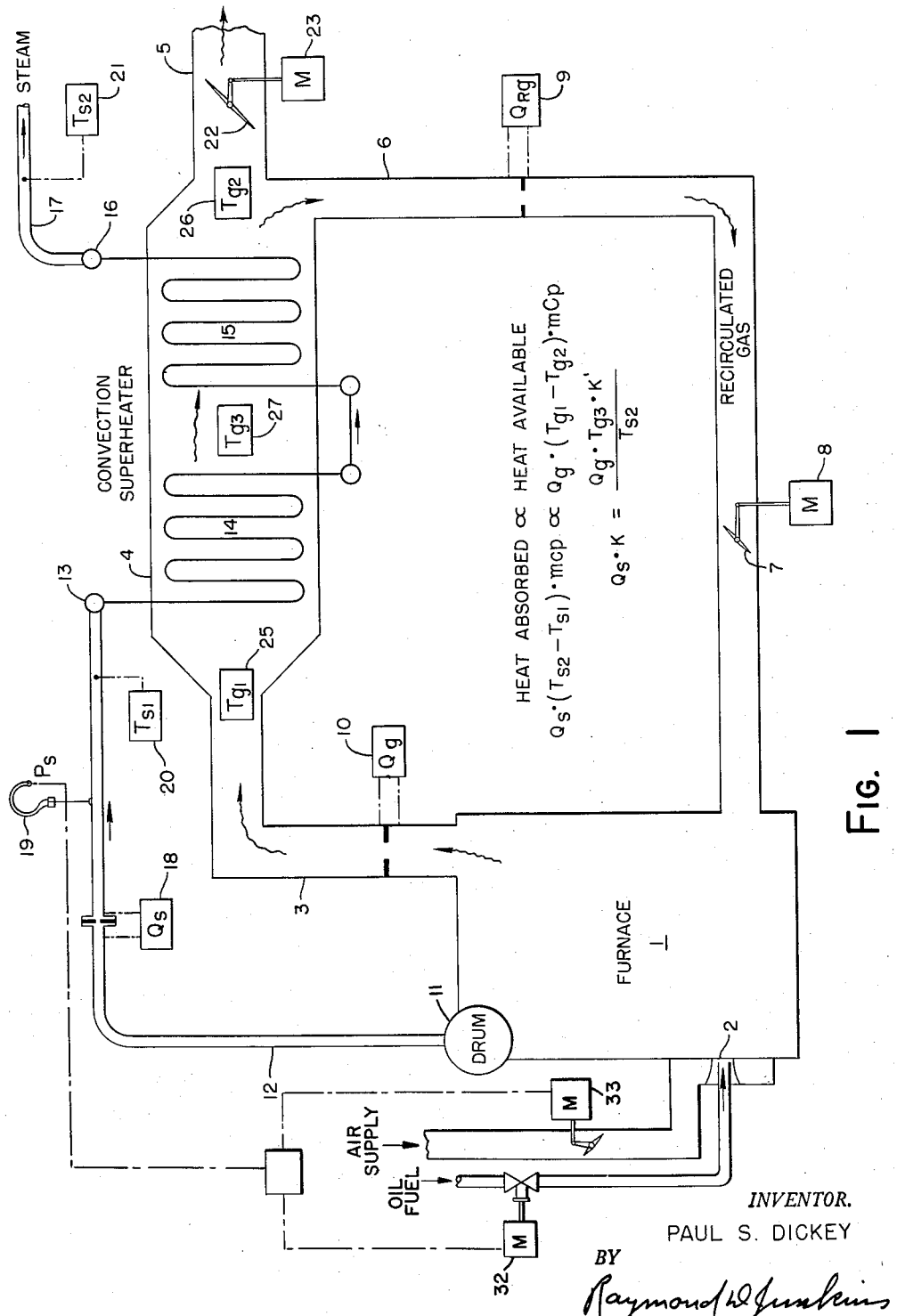
FIG. 1 is a diagrammatic view of a vapor generating and superheating unit from which the basic theory of my invention will be explained.

Referring now to FIG. 1 I show therein in quite diagrammatic form, and not to scale, a vapor generating and superheating unit in connection with which I will explain my invention. The furnace 1 of the unit is supplied with fuel and air for combustion through a burner 2. Gaseous products of combustion leave the furnace after contacting the fluid heating surfaces thereof through a duct 3 to enter a convection superheater 4. From the superheater 4 the gaseous products of combustion pass through a duct 5 and may contact economizer and air preheater surfaces prior to reaching the stack. A controllable portion of the gaseous products of combustion leaving the superheater 4 are recirculated through a duct 6 to reenter the furnace 1 at a selected location which, in the explanation of FIG. 1, need not be specified. The quantity rate of flow of gases ($Q_{rg}$) being recirculated is regulated by a damper 7 positionable by a motor 8 and is measured by an orifice or differential pressure type meter 9. In similar manner a differential pressure responsive meter 10 continuously determines the quantity weight rate of flow ($Q_g$) of the total heating gases passing through the duct 3, providing thereby a measure of the mass flow of gases available for heating the superheating surfaces.

Steam from the generating portion of the unit leaves a separation drum 11 through a conduit 12 to the header 13 of the primary superheater surface 14. The steam continues in serial flow through a secondary superheater 15 to its header 16, final output conduit 17, and point of usage which is usually a high pressure steam turbine. The particular arrangement of FIG. 1 does not include any reheating surface for the steam leaving the high pressure turbine but such reheating surface is spoken of in connection with the units illustrated in other figures of the drawing.

At 18 I indicate a meter continuously measuring the quantity rate of flow ($Q_s$) of the steam passing through the conduit 12. At 19 is indicated a Bourdon tube sensitive to pressure ($P_s$) of the steam in conduit 12. An instrumentality 20 provides a continuous determination of the temperature ($T_{s1}$) of the saturated steam entering the superheater header 13, while an instrumentality 21 provides a continuous measure of the final superheated steam temperature ($T_{s2}$) leaving the superheating surfaces. The location of the steam flow rate meter 18 is optional and depends many times upon piping layouts and similar structural conditions. The temperature of the steam may remain more constant in conduit 12 than in conduit 17 because it is the saturation temperature of the existing steam pressure, while the steam temperature in conduit 17 may vary by variation in the amount of superheat added above saturation temperature.

The heating gases entering the convection superheater 4 through the duct 3 include the fresh products of combustion from the furnace 1 as well as products of combustion recirculated through the branch duct 6 under control of the damper 7. Exit of gases to the stack, through the duct 5, is regulated by a damper 22 positionable by a motor 23. The heating gases enter the superheater 4 at a temperature ($T_{g1}$) continuously measured by an instrumentality 25 and the temperature ($T_{g2}$) of the gases leaving the superheater 4 is continuously measured by an instrumentality 26. At 27 I indicate an instrumentality continuously determining the value ($T_{g3}$) as an average or representative temperature of the gases contacting the superheating surfaces.

By way of example, in connection with FIG. 1, the gas temperature $T_{g1}$ may be about 2000 F., $T_{g2}$ about 800° F., and $T_{g3}$ about 1400–1500° F. Preferably the elements sensitive to gas temperature $T_{g3}$ are so located in the gas path as to indicate within a range 1000–1500° F. Another way of stating this is that the location of the measurement $T_{g3}$ will be somewhere along the heat exchange surfaces of the superheater 4 where the temperature $T_{g3}$ will reflect furnace temperature and firing conditions prior to fluctuations in steam temperature within the superheating surfaces which would be a result of the changed firing condition. Thus the temperatures $T_{g1}$, $T_{g2}$, and $T_{g3}$ are chosen as "cause" indexes rather than making use of "result" indexes.

The primary purpose of the present invention is to maintain the final temperature $T_{s2}$ of the superheated steam leaving the unit through the conduit 17 as nearly constant at the optimum or desired value as is possible, regardless of variations in demand upon the unit as a whole.

For practical operating and controlling purposes the superheating passes of the unit may be considered as a heat exchanger in which the heat gained by the steam is equal to, or varies directly with, the heat given up by the heating gases. This concept neglects available heat lost by radiation, etc., but such losses are substantially constant throughout the expected range of operation and may therefore be taken into account by a fixed or percentage factor.

Thus, in general (Steam flow rate×heat gain)=(Gas flow rate×heat loss) where the same units are employed.

Basic fuel firing rate is controlled to hold uniform steam pressure $P_s$ while satisfying the load or demand. Thus I may assume that $P_s$ at the entrance to the superheating surfaces remains substantially constant. Temperature $T_{s1}$ of the steam will then be the saturation temperature and a constant value. The final total temperature $T_{s2}$ of the steam will be the value $T_{s1}$ plus the superheat added by the heat exchange and desirably the value $T_{s2}$ will be constant; the desideratum of efficient operation or control being to produce a constant value $T_{s2}$. However, it will be appreciated that $T_{s1}$ and $T_{s2}$ may vary and thus they should be continuously measured and used as a visual guide or incorporated in a controlling instrumentality. I thus employ $(T_{s2}-T_{s1})$ as a measure of the heat gained by each pound of steam passing through the convection superheating surfaces. In similar manner $(T_{g1}-T_{g2})$ may be used as a measure of the heat lost by each pound of the gases passing over the convection superheating surfaces.

The "heat available" for superheating the steam above its saturation temperature (corresponding to its pressure) is proportional to the quantity of the heating gases passing over the heating surfaces and to their average temperature. Stated another way, the "heat available rate" varies as the weight rate of flow of heating gases multiplied by the loss in temperature of the flowing gases and their mean specific heat. I call this "heat available rate" the gas mass heat flow rate $(M_{gh})$.

Thus
$$M_{gh} \propto Q_g \cdot (T_{g1}-T_{g2}) \cdot mCp$$
where
$M_{gh}$=Heat available in the gases, i.e. gas mass heat flow rate in B.t.u. per hr.
$Q_g$=Weight rate of gas flow in lb. per hr.
$T_{g1}$=Entering gas temperature (F.)
$T_{g2}$=Leaving gas temperature (F.)
$mCp$=Mean specific heat of the gases.

The "heat absorbed rate" varies as the weight rate of flow of steam multiplied by the gain in temperature of each pound of the steam and by its mean specific heat. I call this the steam mass heat flow rate $(M_{sh})$. Thus
$$M_{sh} \propto Q_s \cdot (T_{s2}-T_{s1}) \cdot mCp$$
where
$M_{sh}$=Heat absorbed by the steam, i.e. steam mass heat flow rate in B.t.u. per hr.
$Q_s$=Weight rate of steam flow in lb. per hr.
$T_{s1}$=Entering steam temperature (F.) i.e. saturation temperature corresponding to pressure ($P_s$)
$T_{s2}$=Leaving steam temperature (F.)
$mCp$=Mean specific heat of the steam Now heat absorbed rate varies with heat available rate so
$$M_{sh} \propto M_{gh}$$
and
$$Q_s \cdot (T_{s2}-T_{s1}) \cdot mCp \propto Q_g \cdot (T_{g1}-T_{g2}) \cdot mCp$$
but If steam pressure $P_s$ remains constant
Then saturation temperature $T_{s1}$ remains constant and Mean specific heat $mCp$ remains constant and if I assume a constant demand so that $Q_s$ remains constant, then for any given load $(Q_s)$ the maintenance of the desired final superheated steam temperature $(T_{s2})$ depends upon maintaining the correct heat flow $(M_{gh})$ across the superheating surfaces.

Thus the demand for heat
$$M_{sh} = Q_s \cdot K$$
where
$K$=a constant determined for design conditions of steam pressure, final steam temperature and specific heat and the supply rate of heat may be expressed as
$$M_{gh} = Q_g \cdot T_{g3} \cdot K'$$
where $T_{g3}$=represents an average value of temperature of the heating gases; one which rises and falls with $T_{g1}$, $T_{g2}$ as well as with $(T_{g1}-T_{g2})$ and $K'$=a constant determined for the design and operating conditions as well as specific heat of the gases The heat absorbed by the steam is a function of "heat level" $T_{g1}$, $T_{g2}$, $T_{g1}-T_{g2}$, and the average $(T_{g1}+T_{g2})/2$; as well as the "heat content" $M_{gh}$ or gas mass heat flow. Variation in either the entering temperature $T_{g1}$ or mass flow $Q_g$ may effect a change in $T_{s2}$. Furthermore, as the gases pass through the heat exchanger not only the temperature, but the velocity, density and specific heat may vary, and to many times the degree of change in the similar conditions of the steam. By utilizing an average gas temperature $T_{g3}$ taken at a location judiciously chosen I have a measurable index representative of the general heat level of the gases and their unit heat content. This, together with a measure of weight rate of flow $Q_g$ provides, with $K'$, a continuous determination of $M_{gh}$. Thus "heat available rate" $M_{gh}$ may be varied by $Q_g$ "the weight rate of gas flow" or by the heat content of each pound of gas i.e. by increasing or decreasing $T_{g1}$. Inasmuch as an increase (or decrease) in $T_{g1}$ will usually result in an increase (or decrease) in $T_{g2}$ it is practical to use $T_{g3}$ or
$$\frac{(T_{g1}+T_{g2})}{2}$$
as a control index if the point of measurement of $T_{g3}$ is chosen to be representative.

Thus we see that, to maintain a desired final superheated steam temperature, we may desirably utilize the following indices.

$Q_s$—Weight rate of steam flow (load)
$Q_g$—Weight rate of gases
$T_{g3}$—An average or representative gas temperature and with a check back from $T_{s2}$—The measured value of final superheated steam temperature to show any departure thereof from desired value, and to take into account the non-linear characteristic of a convection superheater We see then, that from a practical control standpoint Heat absorbed $\propto$ Heat available $$Q_s \cdot (T_{s2} - T_{s1}) \cdot mCp \propto Q_g \cdot (T_{g1} - T_{g2}) \cdot mCp$$

and $$Q_s \cdot K = \frac{Q_g \cdot T_{g3} \cdot K'}{T_{s2}}$$

from which we deduce that, for every load ($Q_s$) we may obtain a value for ($Q_g \cdot T_{g3}$), compare the values ($Q_s$) and ($Q_g \cdot T_{g3}$) to see if the heat supply rate is right for the heat demand rate, control the heat supply rate until it is equal to the demand rate, and check back from a measure of $T_{s2}$ to take care of any discrepancies.

Another way of stating this is that I provide a three-element control. I control heat input rate to satisfy heat demand and correct the rate of heat input if the balance does not result in the desired final heat level (temperature) of the output.

The control of gas mass heat flow or "heat available rate" to satisfy "steam mass heat flow required" (to compensate for the anticipated steam temperature change with changes in rating and furnace condition), provides a desirable basis of more directly going to the source of changes affecting final steam temperature (and anticipating the effect) than to depend on only a load index (steam flow rate or air flow rate) with a check back from final steam temperature. So desirably, I basically proportion heat availability to heat required, and check back from final steam temperature.

So far as I am aware no one has previously used the actual gas mass heat flow rate as an index or element in method and apparatus for controlling steam final temperature on units of the type under discussion equipped for recirculation of heated products of combustion to the furnace or, in fact, on units having convection heating surfaces receiving heating gases from a furnace. Attempts have been made to ascertain continuously the temperature within the superheater tubes near the entrance, near the exit and at intermediate locations. Attempts have also been made to obtain the temperature of the steam before it enters the convection superheater and to use this temperature measurement in conjunction with the final steam temperature, in controlling spray attemperators, gas by-passes, and the like. These methods and arrangements have not been entirely satisfactory. A considerable time and thermal lag occurs in the transfer of heat through the films and metal of the tube surfaces, and with rapidly fluctuating heat release loads and temperature effects as caused by slagging or deslagging of the furnace walls with corresponding fluctuating variations in heat absorption of the generating surface as well as flame drift around the furnace, has introduced lags in final steam temperature control systems with corresponding hunting and overshooting. Through the use of my invention I avoid these inaccuracies and adverse effects by utilizing continuous and substantially instantaneous measurements or determinations of the actual rate of heat supply to the convection superheating surfaces as a principal anticipating element in my control system to maintain final steam total temperature.

In certain embodiments of my present invention I provide for the absorption of heat by the superheater and by the reheater by placing them in separately controlled gas streams arranged for parallel flow. Spray attemperators are arranged in connection with both the superheater and the reheater. At a load where the heat carried by the gases going over the superheating and reheating surfaces is of such an amount as to result in an excessive absorption by the superheating and reheating surfaces, I regulate the gas flow over the reheater so that it will absorb just sufficient heat to bring the final temperature to the desired value. This will result in a gas flow in the other streams over the superheater surface which will raise the superheater absorption so that, if uncontrolled, it will give a delivered steam temperature in excess of the optimum, but I reduce this excess by spray attemperation in the superheater section.

The control indices as outlined above are most useful on units employing gas recirculation for controlling the rate of such recirculated gas flow. By this means I vary the volume rate and temperature of the gases entering the superheater path for any given load. This takes account of the superheater characteristic curve and in general increases the recirculation as load decreases to raise the final steam temperature. However, the control indices mentioned are also new and useful in the operation of units employing tilting burners, controlled level firing, or other arrangements; where the heating gases pass over convection superheating surfaces.

While I have chosen to describe my invention particularly in connection with units supplied with fuel in the form of pulverized coal in suspension I have used the term "fluent" to denote all fuels burnt in suspension such as pulverized fuel, oil and gas. Furthermore, it should be understood that the invention is not limited to use with "fluent" fuels but may equally as well be employed with units having stokers or supplied with waste heat from other sources.

In connection with FIG. 1 I have explained the use of a measuring instrumentality 10 for continuously determining the value $Q_g$ which represents the mass flow rate in lb. per hr. of the total heating gases passing through the duct 3 to the superheating surfaces. Later in this description I will refer to the use of the gas pass 4 as a restriction to flow continuously producing a pressure differential or drop in pressure which may actuate a flow rate meter in general similar to the meter 10. I have previously mentioned my choice of $T_{g3}$ (a temperature taken at a selected location along the gas flow path) to be representative of the gas temperature conditions throughout the path. Such a practical choice of temperature value works decidedly well with a measurement of mass flow through the heat exchanger by using the drop in pressure thereacross, because the two practical determinations wash out many of the variables which otherwise would have to be taken into account and greatly simplifies the instrumentality used for measurement and control purposes.

The meter 10 for continuously determining the value $Q_g$ which represents the mass flow rate in lb. per hr. of the total heating gases passing through the duct 3 may be connected across an orifice in the duct 3 as shown in FIG. 1 here or across the superheating gas path as between the points 45, 46 of FIG. 6. For a meter of this type, reference may be had to the Junkins Patent 2,596,030, and the meter 11 (AF) of FIG. 1 there which is responsive to the pressure differential existing across the points 12, 13 of the boiler passes. Such a meter may indicate or record in terms of volume rate of flow or of weight rate of flow. The theory of such a measurement is clearly expounded at column 3, line 35 to column 4, line 45, inclusive, of the patent. For extracting the quadratic relation between differential pressure and rate of flow a commercially well known device is the Ledoux bell meter of Patent 1,064,748. In each instance the meter is calibrated to record in terms of lb. per hr. Meter 9 of the gas recirculated through the duct 6 is of a similar type.

In general, then, the meter utilizing the drop in pressure along the length of the gas path through the convection superheating surfaces compensated for, or multiplied by, a temperature representative of the average temperatures throughout the path, will produce a result in terms of "mass gas heat flow rate" in which the majority of the variables have washed out. The gas differential pressure drop covers a physical distance or extent of path throughout which the heating gas is continually changing as to (for a fixed weight rate of flow) volume rate, velocity, density, mean specific heat, and temperature. As temperature drops the volume decreases, density increases.

velocity decreases, specific heat decreases; and as a heat meter I have found that $Q_g$ (actuated from this differential pressure throughout the length of the heat exchanger), compensated by a value of average gas temperature, is a commercially accurate and instantaneous guide for operation and automatic control. Thus I provide a new and novel mass heat flow meter, in addition to method and apparatus including this meter as a control or operation guide. The entire system provides a continuous use of cause rather than result, with anticipation prior to any thermal lag of heat transfer between the heating gases and the steam being heated.

Figure 3:
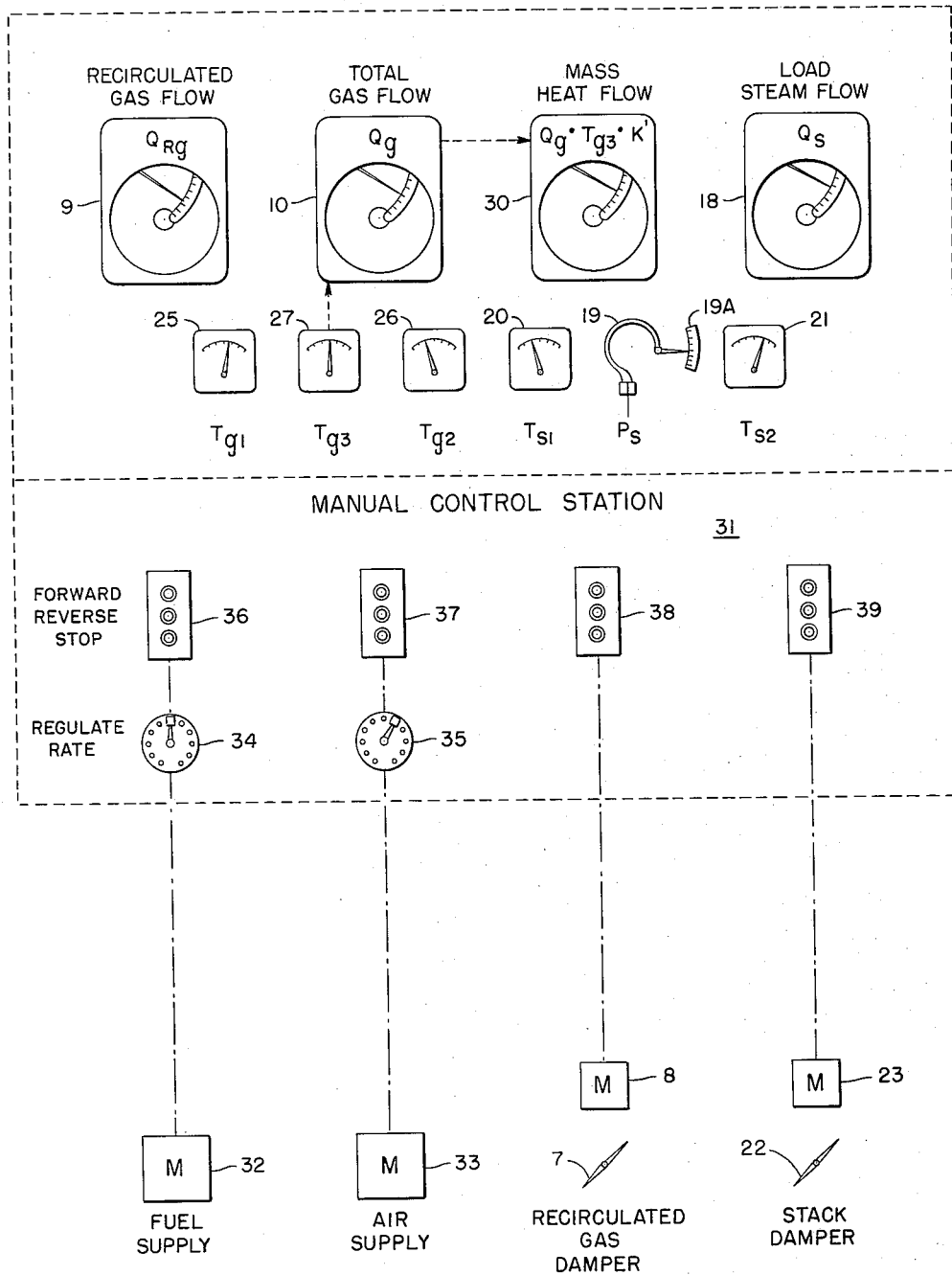
FIG. 3 illustrates a manual control station for regulating the operation of the unit of FIG. 1.

In FIG. 3 I have schematically illustrated certain indicating instrumentalities useful as a guide for remote manual control of the variable operating factors to allow manual operation of the unit in accordance with my new methods. The Bourdon tube 19 is sensitive to generated vapor pressure and provides a visual indication thereof on a scale 19A. The indicating-recording meters 9, 10, 30, 18 provide visual manifestation of recirculated gas flow rate, total gas flow rate, mass heat flow rate, and load in terms of steam flow rate, respectively. Similarily, the indicators 25, 27, 26, 20 and 21, provide visual manifestation of the designated gas and steam temperatures (see FIG. 1). The points of measurement of these operational variables may be widely separated on the actual unit but I preferably group the indicators at a central location having a "manual control station" 31.

Figure 2:
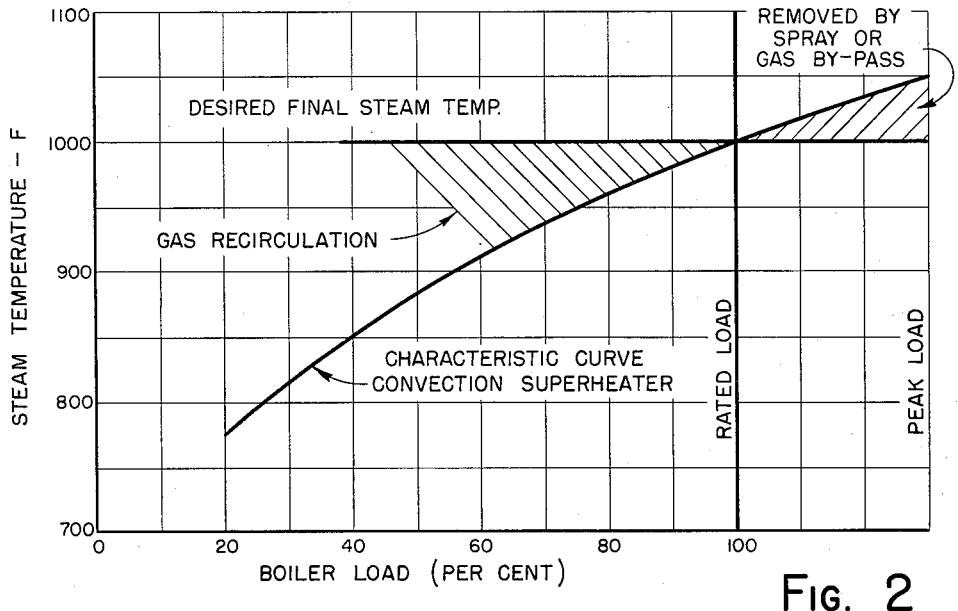
FIG. 2 is a graph of characteristics of a convection superheater.

The meter 30 of FIG. 3 represents "mass heat flow= $Q_g \cdot T_{g3} \cdot K'''$" showing a continuous multiplication of the output of meter 10 by the indication of temperature $T_{g3}$ and by a constant $K'$. Such multiplication is clearly explained in the Junkins Patent 2,596,030 where, at the right of FIG. 2, is produced a multiplication $AF \cdot M \cdot B$ by the cascading of resistances and in which the variables AF and B are multiplied together and in turn multiplied by a hand or manually adjusted value M which corresponds to the constant $K'$.

Through the agency of power devices 32, 33 the fuel and air is regulated through the burner 2 for satisfying the steam flow demand and maintaining final steam pressure at desired value. In connection with FIG. 3 it seems unnecessary to indicate what type of fuel is controlled by the device 32 or what type of forced or induced draft fans may be controlled by the device 33. However, inasmuch as such controls must be regulated as to rate I indicate at 34 and 35 rheostats which may be used to regulate the feeding devices 32, 33. Also the push-button stations 36, 37 allow forward-reverse-stop control of the motors 32, 33. Pushbutton stations 38, 39 are used for operating the motors 8 and 23 which position the dampers 7 and 22 respectively, thus controlling the rate of recirculation of gases and uptake damper.

The manual control station 31 is usually centrally located and is provided with electrical switches, etc. for controlling the motors and devices mentioned. Usually the station 31 may be so constructed to be of what is known as bench-board form wherein the recording and indicating instruments in the upper dotted rectangle are located on a vertically placed panel. Forwardly of the vertical panel is a horizontal or inclined control portion of the board containing the pushbutton and rate regulating means. It will now be clear that my improved method of operation of the unit may be manually performed by an operator located at the manual-control-station 31, observing the measuring instrumentalities, and selectively remotely activating the controls 32, 33, 8 and 23. Selective and/or sequential operation may be obtained as well as proper proportioning of the fuel and air supply.

In general it may be said that the arrangement of FIG. 3 allows an operator to observe the visual indication of variables in the operation of the unit of FIG. 1 and to so control the fuel and air supply, as well as the dampers 7 and 22, as to satisfy demand for steam flow rate, keep the final steam pressure constant, and maintain final superheated steam temperature at the desired or optimum value. In addition to controlling the fuel and air supply and uptake damper the operator may remotely position the recirculation damper 7 to regulate the mass heat flow or heat available to the convection superheater 4 whereby the latter may cause the saturated steam to be raised in temperature to a total value at location $T_{s2}$ as desired.

Referring now to FIG. 4 I show therein, in very diagrammatic form, the gas flow path in relation to the different heat exchange surfaces for a unit of more commercial type than the diagrammatic unit of FIG. 1. This arrangement ties in with the graph of FIG. 2 which shows the possibility of removing what otherwise might be excess heat from the steam by the agency of either a gas by-pass or attemperation. The gases first contact the generating section 40 and then pass through the superheating surfaces 15, 14 prior to reaching the economizer and air heater. A by-pass 41 is diagrammatically shown around at least a portion of the superheating surfaces. I further show that the recirculating gas duct 6 joins the gas flow path at the entrance to the air heater to recirculate gases to a location relatively near the entrance of generating section 40.

Feed water leaving the economizer joins the generating surface (diagrammatically) through a pipe 42 and leaves the generating section through a pipe 43 to enter the primary superheater 14. Vapor leaving the primary superheater 14 passes through the secondary superheater 15 and leaves the unit through a main steam line 17 to a turbine or other utilizer.

Control of the gas by-passed through the duct 41 is by way of a damper 44 and it will be evident that FIG. 3 might well show the by-pass damper 44, and a motive means for positioning the same, under the control of another pushbutton station on the panel 31.

In FIG. 4 I have indicated that the gas temperature $T_{g3}$ is taken at the preselected location intermediate the superheater surface and ties into the gas mass heat flow meter 30. For measuring the mass flow of the gases through the superheater surfaces I take the pressure differential across the locations 45, 46 which provides a pressure drop varying with weight rate of flow and, as previously pointed out, takes into account variations in gas density, volume, etc. of the gases as they gradually cool down in passing through the superheater surfaces.

Many factors may contribute to variation in temperature of the gases entering the convection superheating surfaces. Change in demand, with consequent increase or decrease in fuel-air admission rate would change the gas mass flow as well as its velocity and temperature. For steady state demand, the furnace exit gas temperature may vary from such causes as flame waver resulting in varying generating surface absorption, slagging or deslagging of generating surface, burnability of the fuel, etc. Regardless of the cause of variation, the fact remains that a variation in such temperature may cause an undesired deviation in final steam temperature from the desired value. Furthermore, as I have pointed out in connection with FIG. 2, the characteristic curve of a convection superheating surface is not linear and is not a horizontal line throughout the various ratings. To vary the mass heat flow rate of the gases supplied to the superheating surfaces, I preferably position, either automatically or manually, the damper 7 as previously mentioned. It will be seen that the desired control operation is to remove the possibility of excess steam temperature at the higher ratings and to raise the deficient steam temperature at the lower ratings. I have explained how this control may be accomplished manually through the agency of the arrangement of FIG. 3. Reference to FIG. 5 will now be made which shows a preferred automatic control system for the apparatus of FIG. 4.

I have shown that the expected characteristic curve of convection superheating surface crosses the desired 1000 FTT final steam temperature line at "rated load" and rises to a value of approximately 1050 FTT at "peak load." The shaded area between rated load and peak load represents the operating area of the gas by-pass of FIG. 4 to prevent excessive heat being applied to the superheating surfaces over that rating range. The shaded area below "rated load" indicates the deficiency of heat in the final steam if the expected characteristic curve were experienced. This shaded area indicates the additional heat desirably to be supplied to the entrance to the superheating surfaces to raise the final steam temperature to the desired value of 1000 FTT. This is preferably accomplished through gas recirculation. The method may be accomplished manually through apparatus herein disclosed.

Referring now specifically to FIG. 5 I show therein an automatic control system for controlling the unit of FIG. 4 in accordance with my invention. I indicate that steam pressure as an index of demand, acting through the agency of Bourdon tube 19, positions the movable element of a pilot valve 50 to control the supply of fuel and air to the unit to satisfy demand. The pilot valve 50 is of a known type as disclosed in the Johnson Patent 2,054,464 and is so arranged that its air loading pressure output is continuously established representative of steam pressure as an index of demand.

The steam flow rate meter 18 (as an index of load) is arranged to position the movable element of a pilot valve 51 thereby continuously establishing in a pipe 52 a pneumatic fluid loading pressure representative of $Q_s$. The meter 18 is calibrated to be responsive to pressure differentials existing across an orifice in the steam outflow pipe 17 and to take into account the constant K so that the result is a continuous representation of steam mass heat flow or heat absorbed rate ($M_{sh}$).

The meter 30 is the mass heat flow rate meter for the gases ($M_{gh}$) and is responsive (FIG. 4) to the differential pressure existing between the connections 45, 46, as well as to the representative value of heating gas temperature ($T_{g3}$) and positions the movable element of a pilot valve 53 continuously establishing in the pipe 54 a pneumatic fluid loading pressure representative of $M_{gh}$ the "heat available rate."

The third element in the control system, namely final steam temperature $T_{s2}$, is measured by the meter 21 which positions the movable element of a pilot valve 55 continuously establishing in a pipe 56 a pneumatic loading pressure representative of $T_{s2}$.

It will be seen that the air pressure loading pipe 56 joins the A chamber of a standardizing relay 57 which may be of the type described and claimed in the Gorrie Patent Re. 21,804. Such a relay provides a proportional control with reset characteristics. It provides for the final control index (final total steam temperature), a floating control of high sensitivity superimposed upon a positioning control of relatively low sensitivity. The function of the adjustable bleed connection 59 in the relay 57 is to supplement the primary control of the pressure effective in pipe 56 with a secondary control of the same or of different magnitude as a follow-up or supplemental action to prevent over-travel and hunting. The output of the relay 57, available through the pipe 58, is admitted to the C chamber of a totalizing relay 60, to the A chamber of which is connected the pipe 52 and to the B chamber of which is connected the pipe 54. The relay 60 may be of the type described and claimed in my Patent 2,098,913 and its output is available in a pipe 61 which joins the A chamber of a standardizing relay 62 like the relay 57.

It will be observed that the relay 60 is arranged to primarily compare the heat available rate with the heat demand rate, i.e. to compare $M_{gh}$ with $M_{sh}$ by having the fluid loading pressures representative thereof acting in opposition in the relay 60 in chambers B and A respectively. If the heat available rate $M_{gh}$ is properly proportioned to the heat demand rate $M_{sh}$ then the relay 60 may be said to be in basic balance condition and no change in the fluid loading pressure within pipe 61 is evident. However, it sometimes happens that while the apparent balance or proportionality exists between the heat available rate and the heat demand rate there may be a discrepancy insofar as final result is concerned, due not only to the shape of the characteristic steam temperature curve but also to dirtying up of the exchange surfaces and for other reasons. To check back on the balance of heat supply rate against heat demand rate I introduce, in the relay 60, the effect of the pressure within pipe 58 originated by the final steam temperature meter 21 when the final total temperature of the steam is not exactly that which is desired. Thus the balance between heat available and heat demand is readjusted, if necessary, to satisfy the final control index, namely final steam temperature.

The output of the standardizing relay 62 is available within the pipe 63 to a manual-automatic selector valve 64 which is preferably of the type disclosed in the patent to Fitch 2,202,485 providing a possibility of hand or automatic control of the dampers. The fluid loading pressure output of the selector valve 64 is available in a pipe 65 and is impressed upon calibrating relays 66, 67. The output of the relay 67 acts through a reversing relay 68 and selector valve 69 to position the recirculated gas damper 7 when necessary. The output of the calibrating relay 66 acts through a calibrating relay 70 and a selector valve 71 to position the by-pass damper 44 when necessary. At the same time the output of the calibrating relay 66 acts through a reversing relay 72 and a calibrating relay 73, as well as a selector valve 74, to position the uptake or stack damper 48 when necessary.

The necessary, and known, adjustments are provided in the measuring instrumentalities 18, 30, 21 as well as in the various relays and in the control mechanisms for positioning the dampers 7, 44, 48 to the end that the by-pass damper and the recirculation damper, or any combination of the dampers 7, 44, 48 may be biased, the one relative to the other or may be sequentially operated responsive to the control indices. Referring to FIG. 2 it will be noted that there is a certain range of boiler load over which the gas recirculation damper will preferably be positioned. During this range of operation (below rated load) the by-pass damper is preferably closed and the superheat damper 48 may be wide open or may be subjected to control to satisfy demand and/or furnace draft conditions. Throughout the upper range of ratings between rated load and peak load the recirculation damper is closed and there may be concurrent throttling of the superheater damper and the by-pass damper to take some of the heated gases away from the superheater and by-pass them therearound.

It will be understood that an operation with rating may be accomplished in two different manners. The gas recirculation control and the gas by-pass control may be substantially end-to-end sequentially as is theoretically indicated in FIG. 2 so that the gas recirculation control (upon increase in rating) ceases at the "rated load" line and the gas by-pass control immediately begins. As a matter of fact, as soon as the gas by-pass damper 44 begins to open there is an initial flow therethrough. The same is probably true when the gas recirculation fan is started, there being of course a minimum flow through the recirculation duct 6. In other words, gas recirculation control can hardly be expected to fade out to zero at "rated load" and the gas by-pass control to start from zero. Each of these will probably have a finite value of starting and ending.

From a practical standpoint the control system will probably be adjusted to have a slight overlap so that when gas circulation is stopped there will already have been some slight opening of the gas by-pass damper and vice versa. Conversely, it may be desirable (rather than having an overlap) to have a slight gap between the stopping of gas recirculation and the beginning of gas by-passing. The control system provides adjustability for any desired combination of such control. In other words, the various calibrating relays of FIG. 5 are so adjusted as to their spring loading and effective pneumatic pressure values that, as rating increases, the by-pass damper 44 is closed while the recirculation damper 7 is being throttled. In the upper range of rating there may be a sequential and/or concurrent operation of the dampers 44, 48. During the upper range of ratings it is possible that the mere opening of the by-pass damper 44 will not cause sufficient by-passing of gas around the superheating surfaces and it may be that concurrently it will be necessary to slightly close down on the superheat damper 48 to force more of the heating gases through the by-pass.

The components of the system may be so adjusted that, after recirculation damper 7 has been closed (and the recirculation fan tripped off) the travel of that control element will cease and the control drive positioning the by-pass damper 44 will begin to open the by-pass damper and thus by-pass some of the available heating gases around at least a portion of the superheating surface. This is end-to-end sequential operation. As previously pointed out, there may be a slight gap or a slight overlap desirably in the operation.

The present invention also provides for spray attemperation rather than the use of by-pass damper and I have shown in FIG. 2 that excess heat in the steam may be removed throughout an upper range of operation by spray attemperation.

FIGS. 6 and 7 show in somewhat diagrammatic form a larger unit employing spray attemperation. FIG. 6 shows in somewhat diagrammatic sectional elevation a typical vapor generator of the size and type herein contemplated and in connection with which I will explain my invention. FIG. 7 is a section (to a larger scale) in the direction of the arrows, along the line 7—7 of FIG. 6. Reference should also be had at this time to FIG. 10 which shows the characteristic curve for steam superheating surface and for reheater surface in a unit of this type.

The generator is of the radiant type, having a furnace 77 which is fully water-cooled with the walls 78 of vertical, closely spaced plain tubes constituting the vapor generating portion of the unit. Products of combustion pass upwardly through the furnace 77 in the direction of the arrow, through a tube screen 79, over a secondary superheater surface 80 and then through primary superheaters 81 and 82 and a reheater section 83. A tubular economizer section 84 is followed by dampers 85, 86, 87 (FIG. 7) of which dampers 85, 86, 87 are shown in FIG. 6. Following the dampers 85, 86, 87 the gaseous products of combustion may pass to an air heater but, prior to the air heater, i.e. after the dampers 85, 86, and 87, is the recirculation duct 88 joining the recirculation fan 89 which feeds a distribution duct 90 for a plurality of entrance ports 91.

Reference to FIG. 7 will show that the secondary superheater 80 is spanned by a primary superheater section 81, a reheater section 83, and a primary superheater section 82. Thus FIG. 6 shows a sectional elevation through the superheater 81 and also shows only the superheater dampers 85. The invention contemplates the desirable sequence of operation of dampers 85, 86, 87 to controllably vary the flow of products of combustion through the different heating sections 81, 83, 82 with distribution of the heating gases over the primary superheater and the reheater by the relative positioning of the dampers 85, 86, 87.

The unit is fired by four horizontal rows of burners which I have designated as X, Y, Z and L. There may be one or more burners in each horizontal row and the burners are supplied with fuel from a plurality of mills. The additional secondary air for supporting combustion is supplied to the burner box 92 by a duct 93 under the control of a damper 94.

I have shown two forms that the gas temperature measuring instrumentalities may take. I indicate in FIG. 6 the relative elevational locations for taking average gas temperatures $T_{g1}$, $T_{g2}$ and $T_{g3}$. In FIG. 7 I indicate that I may put a temperature averaging sensitive device 95 across the width of the boiler at location $T_{g1}$ of FIG. 6 to obtain an average temperature of the gases entering the heating surfaces. It is true that the gases at this point have passed over a certain portion of the heating surfaces but a much more practical temperature is obtained here than at the furnace side of the screen tubes 79 or even between the screen tubes and the first tube row of the superheater 80. The temperature sensitive element 95 may be of the gas filled type or it may be a system of thermocouples or other devices for averaging the temperature across the path. In fact, it may consist of a bolometer system sighted from one side of the path of the other.

In FIG. 7 I show another arrangement wherein a series of temperature sensitive elements 96 may be spaced across the path and so connected as to average the temperature values. In FIG. 6 I show one of the elements 96 extending at the location designated $T_{g3}$.

For measuring the mass gas flow or $Q_g$ I indicate on FIG. 6 the pressure connections 45, 46 leading to a mass flow meter designated as A, B, C. Preferably the drop in pressure through the sections 81, 83, 82 is separately sensed and thus I indicate three mass flow measuring devices $Q_g$ which are designated respectively at A, B and C and are so indicated on FIG. 8 wherein their three values are impressed upon the mass heat flow meter 30 to obtain the total gas mass flow through the paths 81, 83 and 82.

In a unit of this type spray attemperation is preferable as a temperature corrective measure because of its simplicity of construction, ease of operation, and low pressure drop. It has, however, the disadvantage that it has a tendency to effect a loss in over-all steam turbine plant cycle efficiency because of the latent heat loss to the condenser of the vapor resulting from the reheat attemperator admixture without the advantage of expansion of that vapor through the high pressure turbine. The present invention provides for the spray attemperation of high pressure steam, with the minimization of reheat spray attemperation, while effecting optimum concurrent control of both the high pressure superheated steam temperature and reheated steam temperature. I preferably utilize spray attemperation for the superheater steam but provide only hand or manual control on the spray attemperation for the reheat portion of the system so that it may be utilized only under extreme operation conditions or as a safety factor. As the overload range in the normal operation of a steam power plant would be incurred infrequently the effect on the over-all plant economy will not amount to much.

Following the steam path of the diagram FIG. 6, it will be noted that steam at saturation pressure and temperature, from the boiler drum, enters the primary superheaters 81, 82 through a header 100 and leaves these surfaces through a conduit 101 entering a spray attemperator 102. Water for the spray of the attemperator 102 is admitted through a pipe 103 under control of a valve 104 positionable by a motive means 105 and the rate of supply of water is continually measured by an instrumentality ($WF_1$) 106. Temperature ($T_{s1a}$) of the steam leaving the attemperator 102 is measured by an instrument 107 and the steam passes through a conduit 108 to enter the header 109 of the secondary superheater 80. Steam leaves the secondary superheater 80 from the header 110 passing through a conduit 111 to the high pressure turbine 112. The weight rate of flow of the steam ($Q_s$), the pressure ($P_{s2}$) and the temperature ($T_{s2}$) are measured in the conduit 111.

Steam at relatively low pressure and temperature leaves the high pressure turbine 112 and enters a spray attemperator 113 which is supplied with water through a pipe 114 under the control of a valve 115 positionable by a motive means 116, and the rate of supply of water is continuously measured (WF$_2$) by a meter 117. Steam leaving the attemperator 113 passes through a conduit 118 to the reheater header 119 for the reheater section 83 from which the steam passes to the header 120, through the reheater loop 121, and to the outlet conduit 122 which supplies low pressure steam, reheated to approximately 1000 FTT, to the low pressure turbine 123.

Reference may now be had to FIG. 8 which shows a manual control station 125 upon which are located the various instrumentalities of FIG. 6 as well as the necessary pushbutton stations and rate regulating rheostats for remotely manually controlling the regulable devices. Through observation of the steam flow load indicator 18 and steam pressure indicator 19, the operator may regulate the basic rate of supply of fuel and air to the furnace 77. By observation of the steam flow meter and mass heat flow meter he may adjust the recirculating gas damper to proportion the gas mass heat flow to the steam mass heat flow and then by observation of the final steam temperature T$_{s2}$ may make a readjustment of the recirculating gas damper to thereby vary the mass heat flow of the gases and attain the desired final steam temperature. As rating increases and the amount of recirculation is decreased until the damper 7 is closed and possibly final steam temperature T$_{s2}$ begins to cross over and exceed the 1000 FTT line, the operator will begin to open the superheater attemperator valve 104 to bring that temperature down to the desired value. Observation of the final reheated steam temperature T$_{r2}$ may indicate that some opening of the reheater attemperator valve 115 is called for. However, it will probably be advisable to first proportion the heating gases between the paths 81, 82 and 83 through control of the dampers 85, 86 and 87 so as to minimize the amount of attemperation water used in the reheat portion of the cycle.

Reference will now be made to FIG. 9 which depicts a pneumatic control system for operating automatically the apparatus of FIGS. 6 and 7. In this system I preferably leave the reheater attemperator valve 115 for remote hand actuation. The control of the recirculated gas damper 7 is substantially the same as described in connection with FIG. 5. The three loading pressures, separately indicative of T$_{s2}$, Q$_s$ and M$_{gh}$ are impressed upon the relay 60 whose output acts through the pipe 61, relay 62, pipe 63, selector valve 64 and pipe 65 to position the dampers 7. In throttling the dampers 7 toward a closed position (at or near their rated load) further change in the loading pressure in pipe 65 is ineffective, the dampers 7 having reached a limit of travel.

In the system of FIG. 9 the superheater attemperator valve 104 is conjointly controlled responsive to final steam temperature T$_{s2}$ and temperature T$_{s1a}$ at the superheater attemperator outlet acting upon a relay 127 whose output, available in a pipe 128, acts through the selector 129 and pipe 130 to position the valve 104.

The temperature T$_{s1a}$ leaving the attemperator and entering the secondary superheater is very responsive to any changes in water flow to the attemperator. This temperature must vary inversely with boiler rating in order to maintain a constant final temperature at the superheater outlet T$_{s2}$ by counteracting the rising characteristic of the secondary superheater. In other words, T$_{s1a}$ is lowered below the expected temperature at beginning of water supply so as to overcome the rising characteristic of the secondary superheater. At higher ratings I require the maximum amount of attemperation hence a lower attemperator outlet temperature, whereas at lower ratings I require less water, until a point is reached where no attemperator is required and steam temperature leaving the attemperator is the same as the temperature entering the attemperator. The T$_{s1a}$ control is an approximate control and the control from T$_{s2}$ is a vernier adjustment.

Distribution control of the dampers 85, 86, 87 is conjointly from gas mass heat flow (M$_{gh}$) and steam temperature differential between the final superheated steam temperature (T$_{s2}$) and reheat final steam temperature (T$_{r2}$). At 135 I show a measuring instrumentality responsive to the temperatures T$_{s2}$ and T$_{r2}$ for continually determining the difference between the two. The device 135 is arranged to position the movable element of a pneumatic pilot valve 136 to establish in the pipe 137 a fluid loading pressure of predetermined value if the two final steam temperatures are equal or in desired differential relation. Furthermore, the fluid loading pressure in pipe 137 will depart in one direction or the other from the predetermined value if the final steam temperature relationship departs from the desired relationship. The loading pressure in pipe 137 is applied to the A chamber of a standardizing relay 138 whose output is available through pipe 139 to the A chamber of a relay 140. At the same time the output pipe 54 of the gas mass heat flow meter 30 acts through a calibrating relay 141 to enter the C chamber of the relay 140. The output of the relay 140 acts through a pipe 142, a selector valve 143 and a pipe 144 to control instrumentalities arranged to position the dampers 85, 86, 87.

While, in FIG. 7 I illustrate electric motors 145, 146, 147 arranged to position the dampers 85, 86, 87 respectively, for remote manual actuation by the arrangement of FIG. 8, it will be understood that, in connection with FIG. 9, I preferably employ fluid pressure actuated devices such as power pistons for positioning the dampers. Inasmuch as such devices are well known it seems unnecessary to illustrate them in FIG. 9.

Preferably, the adjustment of the power cylinders which are arranged to move the dampers 85, 86 and 87 is such that the dampers 85 and 87 may move together while the damper 86 may be moved in either the same direction or in opposite direction relative to the superheat dampers. Furthermore, the adjustment of the various relays and devices of FIG. 9 may be such as to provide a sequential operation of the dampers 85, 86 and 87 relative to positioning of the recirculated gas damper 7 and of the superheat attemperator valve 104. Reference will now be had to the characteristic graph of FIG. 10 to explain the preferred mode of operation of the boiler unit of FIGS. 6 and 7, through the agency either of the remote manual method means of FIG. 8 or the automatic control means of FIG. 9.

Operation of the illustrative unit, by either the remote manual method of FIG. 8 or the automatic system of FIG. 9, is described with reference to a control point load. The temperature control point load considered with respect to steam temperatures for a multiple gas pass unit as exemplified, might be defined as that load at which the gas flow from the furnace, when the fuel burning equipment is operated at optimum efficiency, has the correct total heat content to provide for superheating of the high pressure steam and reheating of the low pressure steam through the optimum predetermined temperatures, there being no operative steps, such as gas recirculation, taken to modify the amount of heat absorption in the furnace. In a multiple pass unit the gas flowing from the furnace is so divided between the passes at the control point load operating rate that the optimum temperature of the superheat and reheat is attained. At loads between this control point load and a predetermined minimum load, the invention involves an increase in the heat content of the gases for maintaining the final superheat temperature, and this reference is to gases which first pass over the secondary superheater and then over both sections of the primary superheater. This increase in heat content is effected by a recirculating gas system extracting heating gases as previously explained, from near the entrance to the air heater.

The recirculated gas damper 7 is in a wide open position at a predetermined minimum load, and as the load increases from that point to the control point, the damper 7 is gradually closed by the operation of its motive device (motor 8 in FIG. 6) and the remote manual control of the damper 7 is effected from indications of the final superheat temperature afforded by the instrument $T_{s2}$.

The heat content of the gases through the superheater is increased by the gas recirculation system in a lower load range. The flow of recirculated gases is controlled from an indication of, or responsive to, final steam temperature. This action takes place from a minimum load of the order of 500,000 lb. of steam per hr. to the recirculation limiting control point as indicated by line TU in FIG. 10. During this part of the operation, the reheater dampers 86 are wide open, and the primary superheater dampers 85, 87 are operated concurrently with the regulation of recirculated gas damper 7 by the pertinent control elements from a visual indication of the reheat final temperature $T_{r2}$. When a point corresponding to the reheater design point (say 950,000 load) is reached, the superheater dampers 85, 87 are wide open and remain wide open in the load range above or beyond that point.

Above the control point load indicated in FIG. 10 by the line TU, superheated steam is attemperated by the spray attemperator 102 to keep the superheated steam temperature at the predetermined value. To accomplish this, the operator observes the final steam temperature as indicated by $T_{s2}$ and operates the pushbuttons to position the water spray valve 104 to regulate water flow to an amount required to limit the final steam temperature to the desired value.

Through the upper load range (above the reheater design point), the reheater damper 86 is throttled by the operator by his manual operation of means 146 according to the visual indications of reheat final temperature $T_{r2}$. Thus, no water for spray attemperation of reheat is required from the control point load to a load W which is approximately a load value of the order of 1,050,000 lb. of steam per hr. Above this load, and in the overload range to 1,100,000 lb. of steam per hr., it may be necessary to use spray water for reheat attemperation depending upon the extent to which it is considered desirable to limit the heat input into the superheater relative to reheater when considering various factors of which superheater metal temperature, superheater steam pressure drop, superheater draft loss, may be mentioned. When some such factor limits the load at which all of the attemperature is superheat attemperation, then reheat attemperation is initiated for overload conditions. Although a considerable amount of spray water has been used for superheat attemperation between the control point (the line TU) and the load W, such use for superheat attemperation has no such detrimental effect upon the thermodynamic efficiency of the system as would the use of a similar amount of spray water for reheat attemperation.

In the graph of FIG. 10, the line XW, from a load value of 550,000 lb. of steam per hr. to 1,050,000 lb. of steam per hr., represents the control of superheat steam temperature over that range. The curve MO represents the uncontrolled superheat temperature which would have obtained (with heat absorbing surfaces involved) without the use of the invention, and the line PR represents the uncontrolled reheat temperature which would have obtained without the use of the invention.

Inasmuch as the pressure and heat content per lb. of the low pressure steam returned to the reheater from the high pressure turbine exhaust decrease with reduction in load, while the pressure and heat content per lb. of the high pressure steam introduced to the superheater remains substantially constant with a corresponding variation in load, the customary installation of convection heated superheater and reheater will give a steam temperature—load graph which will slope downward from maximum load to low load for the resultant delivery temperatures from both the superheater and the reheater, and the outlet temperature—load graph for the reheater will have a greater slope than the corresponding graph of the superheater. This is clearly shown by the relative curves MO and PR. In other words, they are of the same general curved characteristic but as load decreases they diverge from each other.

The shaded area designated SA (which is inclusive of RA) illustrates the extent of the load range through which superheat attemperation is effected, with the ordinate above line XW indicating the increase in amount of such spray attemperation with increase of load.

The smaller shaded area RA illustrates the extent of the "overload" range through which reheater attemperation is effected and the ordinate above the level of line XW indicates the increase in the amount of spray water so used.

It will be noted that area RA is relatively small as compared to SA and whatever use of spray water in the overload is necessary will be of minor importance as regards the over-all thermal efficiency of the plant which will usually operate below the 1,050,000 lb. per hr. load.

In the contemplated operation of the unit and apparatus exemplified through several phases, each involving a different load range, the following takes place with an increase in load from minimum to maximum.

In phase I, gas recirculation is at its maximum rate and the degree of the superheater pass throttling is greatest at low load, the reheater gas pass being unrestricted. As the load is increased through phase I to the start of phase II, the gas recirculation is reduced to zero, the throttling of the superheater gas pass is reduced so that when phase II is entered the superheater is still throttled to some extent and the reheater pass is unrestricted. The control point load TU lies between phases I and II.

In phase II, the reheater gas pass is continued in an unrestricted condition through this phase with reduction in the restriction of gas flow in the superheater pass and with concurrent introduction and progressive increase in spray attemperation of superheated steam.

There is no restriction to gas flow in the superheater pass in phase III, but the reheater gas pass is progressively restricted and attemperation of the superheater is progressively increased with increases in load.

In phase IV, the overload range, the superheater gas pass is unrestricted, restriction of the gas flow in the reheater gas pass is continued the same as at the termination of phase III, while attemperation is progressively increased in the superheater and attemperation of reheated steam is initiated and progressively increased. This is effected through operation of the pushbuttons (FIG. 8) by the operator, from indications of reheat final temperature $T_{r2}$, or automatically by the sequential and relative adjustments of the instrumentalities of FIG. 9.

As to FIG. 9 the primary control through the standardizing relay 56A brings in the attemperation when steam temperature tends to go above the desired value. The attemperator outlet steam temperature provides a dampening effect on the attemperator control by, in effect, metering the spray water flow. This metering function minimizes the effect of valve characteristics and water supply pressure variation.

The final superheat temperature provides the controlling impulse for recirculation operating in sequence with the superheater attemperator. It will be noted that even though the controlling impulse for recirculation comes from the superheater, the full effect of recirculation will be utilized for the reheater. This is because of the parallel gas paths after the recirculation gases have been combined with the fresh products of combustion.

For the reheater temperature control the superheat-reheat differential element 135, by means of the standardizing relay 138, combined with the totalized gas mass heat flow $M_{gh}$ will position the proportioning dampers to provide the proper reheat temperature. The proportioning dampers are arranged in sequence so that only one is throttled at a time. For instance, if the reheater temperature is low the superheat damper is throttled to force more gases over the reheater to bring it up to the required control point. As the boiler load increases the rise in reheater temperature is faster than that for superheater, thus, the reheater requires a decreasing proportionate amount of gases over its surface. Thus, the superheater damper will open gradually until it is wide open. At this point a further increase in boiler load will result in a throttling of the reheater damper until finally it is in its minimum position. A further increase in boiler load would require attemperation for the reheater. While FIG. 9 shows that the reheater attemperator valve may be manually remotely controlled, it is possible to tie it in with the system of FIG. 9 to come on automatically at the extremely high load indicated by the area RA in FIG. 10.

FIG. 9 has the additional help of attemperator outlet temperature for metering water flow effect, and the boiler load index for the anticipating feature for providing closer and smoother control for loads requiring attemperation on the superheater. The reheat will normally not require attemperation even at high loads as the reheater is always favored by proper control of gas flow over the reheater with or without recirculation fan in service.

The parallel arrangement of superheater and reheater with its control has the distinct advantage over that of the series arrangement as for loads below the control range of the recirculation equipment and proportioning dampers, it will be possible to hold a fixed relationship between the reheater and superheater temperatures. That is, the reheater and superheater temperatures may be made equal in value or held to a desired ratio for all loads below the control range of the equipment. This fixed relationship between the reheater and superheater temperatures for low load operation is made possible by the superheater outlet temperature-reheater outlet temperature differential controller 135 which sends out an impulse to the proportioning damper drives. This temperature differential controller is in effect at all loads, but at the higher loads where the temperatures are maintained at their proper level, the temperature differential elements are relatively inactive.

It will be noted (FIG. 9) that the gas mass heat flow controller 30 acts only in the positioning of the recirculated gas damper 7 and gas distribution dampers 85, 86, 87 and is not effective in the positioning of attemperator valve 104. The relative settings of relays 56A, 57 provide for the sequential operation of recirculation and attemperation (FIG. 2) with, or without, overlap.

FIG. 11 diagrammatically illustrates the gas and steam paths of a unit like that of FIG. 6 utilizing the by-passing of gas rather than attemperation in control of steam temperature over the upper loads. Reference should be made to the curve of FIG. 2 which shows that gas by-pass may be utilized to reduce the excessive steam temperatures be they in the superheat cycle or in the reheat cycle. The control of the arrangement of FIG. 11 is quite similar to that explained in connection with FIG. 9 except that the by-pass duct 41, with its control damper 44, may be substituted for the superheater attemperator valve 104. The proportioning of the gases through the heater paths 81, 83 and 82 is similar to that described for FIG. 9.

Many of the larger units of present day design require dual or twin steam circuits and I have illustrated diagrammatically in FIG. 12 the fluid circuit of such a unit with very schematic representation of the gas flow path through the superheaters, reheater and the recirculated gas passage. The general control and operation of the unit of FIG. 12 is as described in connection with FIGS. 6 and 9 except for requiring further measuring instrumentalities, control devices, and certain refinements for equalization of effects in the dual circuits.

Steam leaving the separation drum of the unit passes to a header 150 supplying the primary superheaters 81, 82 which feed into a common header 151. Leaving the header 151 steam circuit A passes through an attemperator S1 and the temperature of the steam at the outlet of the attemperator is designated at $A-T_{s1a}$. Similarly circuit B passes through an attemperator S2 and its outlet steam temperature is indicated at $B-T_{s1a}$. The A and B circuits cross to join a common header 152 feeding the secondary superheater 80 which discharges to a header 153. Temperatures $B-T_{s2}$ and $A-T_{s2}$ designate the final steam temperatures joining to supply the high pressure turbine 112.

Steam at relatively lower pressure and temperature, discharged from the high pressure turbine 112, splits to reheat circuits A and B which are equipped with attemperators R1 and R2 respectively. Temperatures of the steam at the outlet of these attemperators are designated by $A-T_{r1}$ and $B-T_{r1}$. The steam from the A and B reheater circuits joins the reheater inlet header 154 supplying the reheater 83 which feeds the header 155 and the low pressure turbine 123. Final steam temperature of the reheated steam going to the low pressure turbine 123 is designated as at $A-T_{r2}$ and $B-T_{r2}$.

Gases leaving the primary superheaters 81 and 82 are regulated by the dampers 85, 87 respectively, while gases leaving the reheater 83 are regulated by the damper 86. I diagrammatically show a recirculated gas duct 6 taking a portion of the gases from the superheaters under the control of the damper 7 as in previous description.

The unit of FIG. 12 may be remotely manually controlled in accordance with the present invention by the arrangement of FIG. 8 to which may well be added the additional indicating instrumentalities of FIG. 12 for the twin circuits. It is apparent that the attemperator valves 104, 115 of FIG. 8 may be replaced by valves for the attemperators S1, S2, R1 and R2.

FIG. 13 is an automatic control arrangement (somewhat similar to FIG. 9) for the unit of FIG. 12. The basic arrangement of control is the same as that for FIG. 9, taking into account the dual nature of the steam circuits and the instrumentalities necessary in connection therewith for equalization of temperatures and other conditions throughout the system.

Superheater attemperator valve S1 for the A circuit is under the control of temperature $A-T_{s1a}$ at the outlet of attemperator S1 as well as final steam temperature $A-T_{s2}$ in the A circuit. Similarly the other superheater attemperator valve S2 is under the conjoint control of steam temperatures $B-T_{s1a}$ and $B-T_{s2}$. In similar fashion the final temperature difference $T_{s2}$ and $T_{r2}$ controls attemperator valve R1 while the temperature differential $B-T_{s2}$ and $B-T_{r2}$ controls the attemperator valve R2.

One basic difference in this circuit, from the circuits described in connection with FIG. 9, is in the use of the selector relays 160 and 161. With the controls needed for dual superheaters and reheaters there are two final temperatures for both the superheaters and the reheaters. I provide a selective relay for comparing these two sides so that if there is an unbalance in steam temperature the lower temperature side will provide the controlling impulse to the proportioning dampers for the reheater side and for the flue gas recirculation for the superheater side. For the higher temperature side the loading pressure by-passes the selective relay to go directly to its attemperator to maintain the correct temperature. If a change in operating conditions takes place to reverse the high and low temperature sides, the selective relay automatically transfers the control to agree. Thus, referring to FIG. 13, the selective relay 160 allows the lower of the temperatures $A-T_{s2}$ or $B-T_{s2}$ to be effective through the relay 57 and output 58 upon the relay 60 in control of the recirculation damper. In somewhat similar fashion the two final temperature differential meters 135 and 135A act upon the selective relay 161 to determine the value of the loading pressure entering the relay 140 for comparison with the gas mass heat flow effect of pipe 50 in control of the superheater dampers 85, 87 and the reheater damper 86.

It is to be noted that the mass gas heat flow rate incorporates both the mass gas flow and the average temperature of said flow. I can very well have a high mass flow of gases at say 1800 F. to provide a certain heat transfer or I could have low gas mass flow at say 2200 F. to provide an equivalent heat transfer. The difference will however affect the slagging condition in the early tube banks and thus gas tempering is sometimes used by recirculating at an upper portion of the furnace. I have not shown that in the present application.

On the various drawings the standardizing relays provide sequential operation between the gas recirculation control and the attemperation control. It is not necessary to add additional relays to accomplish this sequential operation. It is accomplished by setting the standard of the relay going to the recirculation control at a somewhat lower temperature than the relay which goes to the attemperator valves.

I propose to control the gas recirculation primarily from superheated steam flow and gas temperature times superheater gas mass flow. This will give an approximately correct amount of gas recirculation to maintain the desired reheat steam temperature as the load and furnace conditions change. The final adjustment of gas recirculation will be obtained from superheater outlet steam temperature through a selector relay which will determine which of the two temperatures in the twin steam circuit is the lower and will give it preference so far as controlling the recirculation is concerned.

With the control of reheat steam temperature functioning as described the design of the boiler will be such as to provide ample superheated steam temperature, and modification of this temperature as required to maintain the desired standard will be obtained by attemperation. The controlling factors in this case will be gas temperatures times superheater gas mass flow to provide approximately the correct initial adjustment, with final control from superheater outlet steam temperature. A tie-back to a loading pressure proportional to attemperator outlet steam temperature will be provided as a check on the accuracy of the water flow adjustment. The control system is laid out to use those factors which show what temperature change to expect, to provide the approximate initial adjustment of the equipment under control. The control equipment does not wait for the act of temperature change to occur, but takes the necessary action to prevent the change by an initial adjustment in proportion to the load and furnace condition changes. Also the control is arranged to prevent attemperation of the reheated steam until control by gas recirculation has been fully utilized.

Superheat control becomes more and more difficult as the boiler pressure and temperature increases because a greater portion of the heat input goes into the superheater rather than steam generation. Also, the mass of metal becomes greater. This increases the lag in response, which may be from three to six minutes at 1000 F. In order to speed up the response, it is necessary, therefore, to have a satisfactory load-responsive element which will anticipate changes in steam temperature. The primary object of superheat control is to balance the heat input against the heat output. The heat output is the steam flow times the constant which is representative of the heat content per lb. The heat input is the gas mass flow times the average temperature of the gas through the superheater. Gas mass flow is the sum of the products of combustion and recirculated gas. This is a measure of the actual heat input to the superheater.

The best way to adjust the gas recirculation and other factors involved on boilers of this kind, (to compensate for the anticipated steam temperature change with changes in rating and furnace conditions), is to go directly to the source of the changes affecting steam temperature. The heat available for changing steam temperature is proportional to the quantity of the flue gases passing over the heating surfaces and to the average temperature of these gases. The maintenance of the desired steam temperature depends on maintaining the correct heat flow across the heating surfaces for any given load and with a check-back from measured final steam temperature.

While I have chosen to illustrate and describe a new and novel "heat meter," "heat flow meter," or "mass heat flow meter," as well as control therefrom, in connection with the heat transfer problems of convection vapor superheaters, it will be understood that my novel concept may be useful in connection with many heat exchange problems. For example, in process heating, cooking, refrigeration, and the like; and I do not propose to be limited except in accordance with the claims which may be granted me.

What I claim as new, and desire to secure by Letters Patent of the United States, is:

1. In a vapor generating and superheating unit of the type having a fluid-cooled combustion zone with a heating gas outlet in one portion thereof and having convection vapor superheating surfaces located in a structurally defined path beyond the combustion zone outlet in the path of heating gas flow, the method of operation which includes, introducing fuel and air for combustion into the combustion zone spaced from the said outlet, increasing the heat availability of the heating gases entering the convection heating path through increased recirculation of a portion of the partially cooled gases from beyond the path back to the combustion zone as rating decreases, continuously measuring the pressure drop of the heating gases flowing through the convection path in terms of gas mass flow rate, continuously measuring a temperature of the heating gases at a selected location in said path, combining the two measurments to obtain an effect continuously representative of the average mass heat flow rate of the said heating gases, and utilizing the effect in controlling the rate of gas recirculation to increase recirculation as the mass heat flow effect decreases and vice versa.

2. In a vapor generating and superheating unit of the type having a fluid-cooled combustion zone with a heating gas outlet in one portion thereof and having convection vapor superheating surfaces located beyond the combustion zone outlet in the path of heating gas flow, the method of operation which includes, introducing fuel and air for combustion into the combustion zone spaced from said outlet, increasing the heat availability of the gases entering the convection heating path as rating decreases through a lower range of ratings by recirculating an increasing portion of the partially cooled gases from beyond the path back to the combustion zone as rating decreases, removing any excess heat from the superheated vapor to maintain an optimum final vapor temperature over an upper range of ratings through liquid spray attemperation of the vapor; regulating the recirculation rate conjointly responsive to a measure of average mass heat flow rate of the heating gases passing through the path, a measure of the mass heat flow rate of the fluid being heated, and a measure of final superheated vapor temperature; and regulating the attemperation conjointly responsive to a measure of the temperature of the vapor immediately after attemperation and to a measure of final superheated vapor temperature.

3. The method of claim 2 including passing the generated vapor through a portion of the superheating surface on its way to a utilizer, returning vapor from the utilizer through a reheating portion of the superheating surfaces;

and proportioning the heating gases flowing through the path between the superheating surface and the reheating surface conjointly responsive to a manifestation of mass heat flow rate of the said gases and to a comparison of final vapor temperature of the initially superheated vapor and of the reheated vapor.

4. Apparatus for generating and superheating vapor including in combination, a furnace having fluid-cooled walls and a heating gas outlet in one portion thereof, a convection superheated positioned beyond the gas outlet in the path of heating gases leaving the furnace, a controllable means supplying the elements of combustion for the furnace, control means for said supply means sensitive to an index of demand upon the unit, fan and duct means arranged to recirculate partially cooled heating gas from beyond the superheater path back to the furnace, a meter sensitive to pressure drop of the heating gases flowing through the convection path as a measure of gas mass flow rate, a second meter sensitive to temperature of the heating gases at a selected location in said path, means continuously interrelating said meters and providing a resultant effect representative of the average mass heat flow rate of the said heating gases, and control means for the recirculating means positioned by the interrelating means to increase recirculation as the resultant effect decreases and vice versa.

5. In a vapor generating and superheating unit of the type having a working chamber to which heat is supplied, the said chamber provided with a heating gas outlet in one portion thereof and having convection vapor superheating surfaces located beyond the chamber outlet in the structurally defined path of heating gas flow, the method of operation which includes, supplying heat to the chamber at a rate to satisfy unit demand, continuously measuring the pressure drop of the heating gases flowing through the convection path in terms of gas mass flow rate, continuously measuring a temperature of the heating gases at a selected location in said path, combining the two measurements to obtain an effect continuously representative of the average mass heat flow rate of the said heating gases, and utilizing the effect in controlling the heat availability of the heating gases entering the convection heating paths in direction tending to increase the heat availability rate as the average mass heat flow rate of the heating gases decreases and vice versa.

6. In a vapor generating and superheating unit of the type having a working chamber to which heat is supplied, the said chamber provided with a heating gas outlet in one portion thereof and having convection vapor superheating surfaces located in a structurally defined path beyond the chamber outlet in the path of heating gas flow, the method of operation which includes, supplying heat to the chamber at a rate to satisfy unit demand, continuously measuring the pressure drop of the heating gases flowing through the convection path in terms of gas mass flow rate, continuously measuring a temperature of the heating gases at a selected location in said path, combining the two measurements to obtain an effect continuously representative of the average mass heat flow rate of the said heating gases, continuously obtaining a second effect which is representative of the heat flow rate of the vapor being superheated in said surfaces, and regulating the heat availability of the gases entering the convection heating surfaces from the chamber outlet in accordance with a comparison of the two said effects in direction tending to increase the heat availability rate as the second effect decreases over the first effect and vice versa.

7. In a vapor generating and superheating unit of the type having a working chamber to which heat is supplied, the said chamber provided with a heating gas outlet in one portion thereof and having convection vapor superheating surfaces located in a structurally defined path beyond the chamber outlet in the path of heating gas flow, the method of operation which includes, supplying heat to the chamber at a rate to satisfy unit demand, increasing the heat availability of the heating gases entering the convection heating path through increased recirculation of a portion of the partially cooled gases from beyond the path back to the chamber as rating decreases, continuously measuring the pressure drop of the heating gases flowing through the convection path in terms of gas mass flow rate, continuously measuring a temperature of the heating gases at a selected location in said path, combining the two measurements to obtain an effect continuously representative of the average mass heat flow rate of the said heating gases, and utilizing the effect in controlling the rate of gas recirculation to increase recirculation as the mass heat flow effect decreases and vice versa.

8. In a vapor generating and superheating unit of the type having a working chamber to which heat is supplied, the said chamber provided with a heating gas outlet in one portion thereof and having convection vapor superheating surfaces located in a structurally defined path beyond the chamber outlet in the path of heating gas flow, the method of operation which includes, supplying heat to the chamber at a rate to satisfy unit demand, increasing the heat availability of the heating gases entering the convection heating path through increased recirculation of a portion of the partially cooled gases from beyond the path back to the chamber as rating decreases, continuously measuring the pressure drop of the heating gases flowing through the convection path in terms of gas mass flow rate, continuously measuring a temperature of the heating gases at a selected location in said path, combining the two measurements to obtain an effect continuously representative of the average mass heat flow rate of the said heating gases, continuously obtaining a second effect which is representative of the heat flow rate of the vapor being superheated in said surfaces, and regulating the heat availability of the gases entering the convection heating surfaces from the furnace outlet in accordance with a comparison of the two said effects in direction tending to increase the heat availability rate as the second effect decreases over the first effect and vice versa.

9. In a vapor generating and superheating unit of the type having a fluid-cooled combustion zone with a heating gas outlet in one portion thereof and having convection vapor superheating surfaces located in a structurally defined path beyond the combustion zone outlet in the path of heating gas flow, the method of operation which includes, introducing fuel and air for combustion into the combustion zone spaced from the said outlet, increasing the heat availability of the heating gases entering the convection heating path through increased recirculation of a portion of the partially cooled gases from beyond the path back to the combustion zone as rating decreases, continuously measuring the pressure drop of the heating gases flowing through the convection path in terms of gas mass flow rate, continuously measuring a temperature of the heating gases at a selected location in said path, combining the two measurements to obtain an effect continuously representative of the average mass heat flow rate of the said heating gases, utilizing the effect in controlling the rate of gas recirculation to increase recirculation as the mass heat flow effect decreases and vice versa, continuously obtaining a second effect representative of final superheated vapor temperature, and readjusting the rate of gas recirculation in accordance with the said second effect.

10. In a vapor generating and superheating unit of the type having a fluid-cooled combustion zone with a heating gas outlet in one portion thereof and having convection vapor superheating surfaces located in a structurally defined path beyond the combustion zone outlet in the path of heating gas flow, the method of operation which includes, introducing fuel and air for combustion into the combustion zone spaced from the said outlet, increasing the heat availability of the heating gases entering the convection heating path through increased recircula- tion of a portion of the partially cooled gases from beyond the path back to the combustion zone as rating decreases, continuously measuring the pressure drop of the heating gases flowing through the convection path in terms of gas mass flow rate, continuously measuring a temperature of the heating gases at a selected location in said path, combining the two measurements to obtain an effect continuously representative of the average mass heat flow rate of the said heating gases, continuously obtaining a second effect which is representative of the heat flow rate of the vapor being superheated in said surfaces, and regulating the heat availability of the gases entering the convection heating surfaces from the furnace outlet in accordance with a comparison of the two said effects in direction tending to increase the heat availability rate as the second effect decreases over the first effect and vice versa.

11. The method of controlling the operation of a vapor generating and superheating unit of the type having a working chamber to which heat is supplied, the said chamber provided with a heating gas outlet in one portion thereof and having convection vapor superheating surfaces located in a structurally defined path beyond the chamber outlet in the path of heating gas flow, the method of operation which includes, supplying heat to the chamber at a rate to satisfy unit demand, varying the heat availability of the heating gases entering the convection heating surfaces through recirculating a portion of the partially cooled gases from beyond the said surfaces back to the chamber, continuously obtaining an effect which is representative of the average mass heat flow rate of the gases contacting said surfaces, and utilizing the said effect in regulating the rate of gas recirculation in direction to increase gas recirculation as the effect decreases.

12. The method of claim 10 wherein the heat availability of the heating gases entering the convection heating path is increased through increased recirculation of a portion of the partially cooled gases over a lower range of operating ratings and including the further steps of limiting final superheat vapor temperature from exceeding a predetermined value over an upper range of operating ratings and adjusting the limiting in accordance with said comparison of the two said effects in direction tending to return such comparison to a predetermined relationship upon departure therefrom.

13. The method of claim 11 including the further steps of by-passing a controllable portion of the heating gases around at least a portion of the superheating surfaces, utilizing said effect which is representative of the average mass heat flow rate in controlling the by-passing, and sequentially effecting the controlling so that the recirculation is accomplished over a lower range of ratings and the by-passing over an upper range of ratings without material overlapping of the controlling across the rated load unit operation.

14. The method of claim 2 including the further step of sequentially effecting the controlling of the recirculation and spray attemperation so that the recirculation is accomplished over a lower range of ratings and the attemperation over an upper range of ratings without material overlapping of the regulation across the rated load unit operation.

15. The method of claim 8 including the further steps of by-passing some of the heating gases around at least a portion of the superheating surfaces through an upper range of ratings, regulating the recirculation rate in accordance with said comparison and a measure of final vapor temperature, and proportioning the total heating gases leaving the furnace between the by-pass and the superheating surfaces to limit final vapor temperature from exceeding predetermined value.

16. The method of controlling the operation of a vapor generating, superheating and reheating unit of the type having a working chamber to which heat is supplied, the said chamber provided with a heating gas outlet in one portion thereof and having convection vapor superheating and reheating surfaces located respectively in separate parallel structurally defined paths beyond the chamber outlet in the path of the heating gas flow, the method of operation which includes, supplying heat to the chamber at a rate to satisfy unit demand, increasing the heat availability of the heating gases entering the parallel convection superheating and reheating surfaces by recirculating a portion of the partially cooled gases from beyond the said surfaces back to the chamber as rating decreases through a load range below a predetermined control point, limiting superheat and reheat temperatures by gas by-passing around the superheating and reheating surfaces through a load range above the control point load, continuously obtaining an effect which is representative of the average mass heat flow rate of the gases contacting said superheating and reheating surfaces, utilizing said effect in regulating the recirculation and the by-passing sequentially across the load point range in direction to increase gas recirculation and decrease by-passing as the effect decreases, and proportioning unby-passed heating gas flow between the parallel paths through both load ranges, the proportioning being accomplished through selectively throttling the gas flow over the superheater only or over the reheater only selectively in accordance with predominance of one of the final vapor temperatures over the other.

17. The method of controlling the operation of a vapor generating, superheating and reheating unit of the type having a working chamber to which heat is supplied, the said chamber provided with a heating gas outlet in one portion thereof and having convection vapor superheating and reheating surfaces located respectively in separate parallel structurally defined paths beyond the chamber outlet in the path of the heating gas flow, the method of operation which includes, supplying heat to the chamber at a rate to satisfy unit demand, increasing the heat availability of the heating gases entering the parallel convection superheating and reheating surfaces through recirculating a portion of the partially cooled gases from beyond the said surfaces back to the chamber as rating decreases through a load range below a predetermined control point, removing any excess heat from the superheated vapor to maintain an optimum final superheated vapor temperature over a load range above the control point load through liquid spray attemperation, continuously obtaining an effect which is representative of the average mass heat flow rate of the gases contacting said superheating and reheating surfaces, utilizing said effect in regulating the recirculation and the liquid spray attemperation across the load point range in direction to increase gas recirculation and decrease liquid spray attemperation as the effect decreases, and proportioning the total heating gas flow between the parallel paths through both load ranges, the proportioning being accomplished to throttling the gas flow over the superheater only or over the reheater only selectively in accordance with predominance of one of the final temperatures over the other.

18. The method of controlling the operation of a vapor generating, superheating and reheating unit of the type having a working chamber to which heat is supplied, the said heating chamber provided with a heating gas outlet in one portion thereof and having convection vapor superheating and reheating surfaces located respectively in separate parallel structurally defined paths beyond the chamber outlet in the path of the heating gas flow, the method of operation which includes, supplying heat to the chamber at a rate to satisfy unit demand, increasing the heat availability of the heating gases entering the parallel convection superheating and reheating surfaces through recirculating a portion of the partially cooled gases from beyond the said surfaces back to the chamber as rating decreases throughout a selected lower range of unit ratings, passing a flow of vapor to be reheated through the reheating surfaces, removing any excess heat from the superheated vapor to maintain an optimum final superheated vapor temperature over an upper range of operating ratings through first liquid spray attemperation, separately removing any excess heat from the reheated vapor to maintain an optimum final reheated vapor temperature over an upper range of operating rating through second liquid spray attemperation, continuously obtaining an effect which is representative of the average mass heat flow rate of the gases contacting said superheating and reheating surfaces, continuously obtaining an effect which is representative of the mass heat flow rate of the vapor being superheated, controlling the recirculation conjointly responsive to said indices and selectively from the final temperature of the superheated vapor or the final reheated vapor temperature dependent upon which of the said final temperatures is lower, controlling the first spray attemperation conjointly responsive to temperature of the superheated vapor immediately after attemperation and to final vapor temperature, controlling the second spray attemperation responsive to a comparison of final superheated vapor temperature and final reheated vapor temperature, and proportioning the heating gas flow between the superheating surfaces and the reheating surfaces to maintain a predetermined relation between final vapor temperatures regardless of specific value.

19. Apparatus for generating and superheating vapor including in combination, a furnace having fluid cooled walls and a heating gas outlet in one portion thereof, a convection superheater positioned beyond the gas outlet in the path of heating gases leaving the furnace, a controllable means supplying the elements of combustion for the furnace, control means for said supply means sensitive to an index of demand upon the unit, fan and duct means arranged to recirculate partially cooled heating gases from beyond the superheater path back to the furnace, a meter sensitive to pressure drop of the heating gases flowing through the convection path as a measure of gas mass flow rate, a second meter sensitive to temperature of the heating gases at a selected location in said path, means continuously interrelating said meters and providing a first effect representative of the average mass heat flow rate of the said heating gases, means limiting final superheated vapor temperature from exceeding a predetermined value over an upper range of operating ratings, and control means for both the recirculating means and the limiting means positioned by the interrelating means to increase recirculation and decrease the limiting means as the first effect decreases and vice versa.

20. The combination of claim 19 wherein the limiting means is a damper controlled gas by-pass around at least a portion of the superheating surfaces.

21. The combination of claim 20 including means coacting with the regulating means sequentially regulating the recirculating means over a selected lower range of operating ratings and regulating the by-pass damper over a selected upper range of operating ratings without material overlap.

22. Apparatus as claimed in claim 20 including a third meter of the final vapor temperature, means modifying the control of the recirculating means under the control of said third meter, and proportioning damper means for the gases through the superheater and those through the by-pass under the control of said third meter.

23. The combination of claim 19 wherein the limiting means consists of a liquid spray attemperator in the path of the vapor being heated by the convection superheater.

24. The combination of claim 23 including means coacting with the regulating means sequentially regulating the recirculating means over a selected lower range of operating ratings and regulating the liquid spray attemperator over a selected upper range of operating ratings without material overlap.

25. Apparatus as claimed in claim 23 including a third meter of the final vapor temperature, means modifying the control of the recirculating means under the control of said third meter, and other regulating means for the attemperator under the conjoint control of the said three meters.

References Cited in the file of this patent

UNITED STATES PATENTS

| | | |
|---|---|---|
| 2,217,634 | Rude | Oct. 8, 1940 |
| 2,229,643 | De Baufre | Jan. 28, 1941 |
| 2,252,367 | Germer | Aug. 12, 1941 |
| 2,519,240 | Fellows | Aug. 15, 1950 |
| 2,526,898 | Powell et al. | Oct. 24, 1950 |
| 2,572,253 | Fellows et al. | Oct. 23, 1951 |
| 2,575,885 | Mittendorf | Nov. 20, 1951 |
| 2,590,712 | Lacerenza | Mar. 25, 1952 |
| 2,663,287 | Armacost | Dec. 22, 1953 |
| 2,730,080 | Stallkamp | Jan. 10, 1956 |
| 2,737,930 | Rowand et al. | Mar. 13, 1956 |

UNITED STATES PATENT OFFICE
CERTIFICATE OF CORRECTION

Patent No. 3,040,719                                               June 26, 1962

Paul S. Dickey

It is hereby certified that error appears in the above numbered patent requiring correction and that the said Letters Patent should read as corrected below.

Column 5, lines 67 and 75, column 6, line 5, first occurrence and column 6, line 10, and column 7, line 3, first occurrence, for the term "mCp", each occurrence, read -- mcp --; column 14, line 73, for "$(P_{s2})$" read -- $(P_s)$ --; column 18, line 23, after "load" insert -- range --; column 23, line 10, for "superheated" read -- superheater --.

Signed and sealed this 20th day of November 1962.

(SEAL)
Attest:

ERNEST W. SWIDER                                         DAVID L. LADD
Attesting Officer                                            Commissioner of Patents